(12) United States Patent
Jain et al.

(10) Patent No.: US 10,922,280 B2
(45) Date of Patent: Feb. 16, 2021

(54) POLICY-BASED DATA DEDUPLICATION

(71) Applicant: Nutanix, Inc., San Jose, CA (US)

(72) Inventors: Amit Jain, San Jose, CA (US); Hinal Gala, San Jose, CA (US); Karan Gupta, San Jose, CA (US); Kilol Surjan, Fremont, CA (US); Parthasarathy Ramachandran, Palo Alto, CA (US); Timothy Sujay Isaacs, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 252 days.

(21) Appl. No.: 15/949,989

(22) Filed: Apr. 10, 2018

(65) Prior Publication Data

US 2019/0340261 A1 Nov. 7, 2019

(51) Int. Cl.
*G06F 15/16* (2006.01)
*G06F 16/174* (2019.01)
*G06F 16/11* (2019.01)

(52) U.S. Cl.
CPC ........ *G06F 16/1748* (2019.01); *G06F 16/122* (2019.01)

(58) Field of Classification Search
None
See application file for complete search history.

(56) References Cited

U.S. PATENT DOCUMENTS

| | | | |
|---|---|---|---|
| 7,504,969 B2 | 3/2009 | Patterson et al. |
| 8,452,731 B2 | 5/2013 | Preslan et al. |
| 8,484,503 B2 | 7/2013 | Akirav et al. |
| 8,549,518 B1 | 10/2013 | Aron et al. |
| 8,601,473 B1 | 12/2013 | Aron et al. |
| 8,626,723 B2 | 1/2014 | Ben-Shaul et al. |
| 8,762,718 B2 | 6/2014 | Barber et al. |
| 8,850,130 B1 | 9/2014 | Aron et al. |
| 9,317,377 B1 | 4/2016 | Wu et al. |
| 9,405,776 B2 | 8/2016 | Preslan et al. |
| 9,563,683 B2 | 2/2017 | Abercrombie et al. |

(Continued)

OTHER PUBLICATIONS

U.S. Appl. No. 15/459,706, filed Mar. 15, 2017, pp. all.

(Continued)

*Primary Examiner* — Alex Gofman
(74) *Attorney, Agent, or Firm* — Vista IP Law Group, LLP

(57) ABSTRACT

A data storage site receives data from different data producer sites. Each of the data producer sites has a particular relationship to the data storage site, and each particular relationship carries corresponding data storage policies, constraints and commitments. When a data storage site receives a data storage request from a data producer, and that particular data is already present from a prior storage operation at the data storage site, the characteristics of the policies, constraints and commitments that were applied when that data was saved by the prior storage operation are reconciled with the policies, constraints and commitments of the requesting data producer. Deduplication logic reconciles different sets of policies, constraints and commitments such that the data can be effectively deduplicated by saving data-producer-specific metadata. Alternatively, the data can be effectively deduplicated by promoting the storage of the data so it covers a broader set of policies, constraints and commitments.

24 Claims, 14 Drawing Sheets

(56) References Cited

U.S. PATENT DOCUMENTS

| | | | |
|---|---|---|---|
| 9,569,456 B2 | 2/2017 | Rao et al. | |
| 9,772,866 B1 | 9/2017 | Aron et al. | |
| 2013/0073528 A1* | 3/2013 | Aronovich | G06F 16/1752 |
| | | | 707/692 |
| 2013/0290274 A1* | 10/2013 | Patil | G06F 11/1453 |
| | | | 707/690 |
| 2017/0024246 A1 | 1/2017 | Gopalan | |
| 2017/0206218 A1* | 7/2017 | Jai | G06F 16/1748 |
| 2018/0276134 A1* | 9/2018 | Cherubini | G06F 12/0888 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, I. et al., "Curator: Self-Managing Storage for Enterprise Clusters", 14th USENIX Symposium on Networked Systems Design and Implementation, NSDI '17, (Mar. 27, 2017).

* cited by examiner

POLICY-BASED DATA DEDUPLICATION

FIELD

This disclosure relates to data deduplication, and more particularly to techniques for policy- and rule-based action reconciliation in high-performance data deduplication environments.

BACKGROUND

With the explosion of data, more and more techniques are needed to manage unnecessary duplication of data items. In some deduplication regimes, when responding to a request for storing data (e.g., a write request in a backup scenario), a file system or agent checks to see if the identical data item (e.g., the identical file or identical portion of the particular file, or the identical block of the particular file) already exists in the file system or other managed storage repository. If so, deduplication logic will prevent the data item from being stored again, and the request for storing data is satisfied by the occurrence of the already-stored data item—without duplicating storage of the identical data by storing it again. Checksums or other fingerprints are used to determine uniqueness of the data item, which uniqueness characteristic is in turn used to determine whether or not the identical data item already exists in storage.

In modern computing environments, a single data repository at a central site can be accessed by multiple independently-operated sites (e.g., satellite sites). Each independently operated site might have one or more individual data owners, which in turn might have individual data storage relationships with respect to the central site. Such relationships include contracts, subscriptions, commitments, and related policies such as backup frequency policies, restore point commitments, and other service level agreement provisions. For example, a first data owner might have a policy to store its data in a "higher tier" or "highest tier" of the data repository while a second data owner might have a policy to store its data in a "lower tier" or "lowest tier" of the data repository.

Unfortunately, deduplication logic (e.g., for making decisions to replicate a block of data or not to replicate a block of data to a storage repository) is often based merely on a fingerprint or other characteristic of uniqueness of the data in the block. This coarse logic is deficient. Specifically, techniques that decide not to replicate a block of data merely based on a fingerprint or other characteristic of uniqueness are deficient, at least in that they fail to consider other characteristics that might apply to the particular requestor/ owner, or to the particular block or portion of the file, etc.

What is needed are techniques for deduplication that improve over the aforementioned deficiencies.

SUMMARY

The present disclosure describes techniques used in systems, methods, and in computer program products that implement storage policy reconciliation when performing data deduplication, which techniques advance the relevant technologies to address technological issues with legacy approaches. More specifically, the present disclosure describes techniques used in systems, methods, and in computer program products for rule-level reconciliation.

The disclosed embodiments modify and improve over legacy approaches. In particular, the herein-disclosed techniques provide technical solutions that address the technical problems attendant to making decisions to replicate a block of data or not to replicate a block of data to a storage repository. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques results in storing less data than would otherwise be stored while still honoring demands that derive from different characteristics of different data producers. Storage of less data reduces the size of data catalogues and indexes, which in turn reduces the amount of computer processing power needed to access stored data and its metadata, which means that storage and retrieval systems that comport with the embodiments disclosed herein are more efficient than other systems.

Moreover, use of the disclosed techniques and devices within the shown environments as depicted in the figures provide advances in the technical field of data storage as well as advances in various technical fields related to computing platform management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
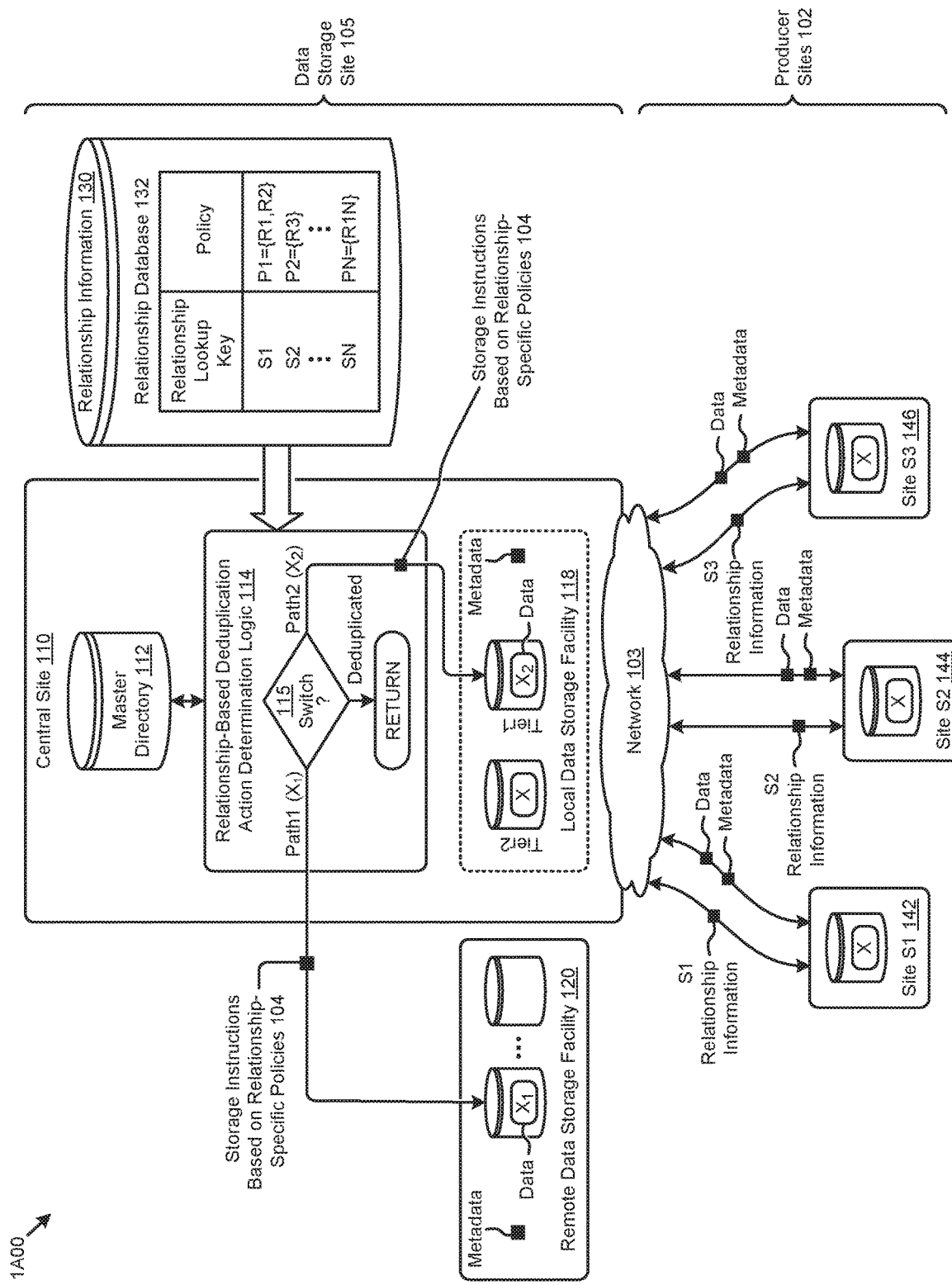
FIG. 1A is a block diagram of an environment in which systems for policy-based data deduplication can operate.

Embodiments in accordance with the present disclosure address the problem of making policy-specific decisions to replicate a block or range of data or not to replicate a block or range of data to a storage repository. Some embodiments are directed to techniques for deduplication that consider particular storage capabilities that are be desired or required by a particular data owner. Example embodiments consider sets of storage capabilities or desires pertaining to a block or range of data from a first site or owner that are different from the particular storage capabilities or desires of a different site or data owner of the identical block or range of data. The accompanying figures and discussions herein present example environments, systems, methods, and computer program products to implement rule-based reconciliation in policy-based data deduplication.

Overview

Disclosed herein are techniques that are used to decide to replicate or not to replicate a particular data item based on that data item owner's policies or that data item owner's rules or requirements. In some cases, a decision to replicate or not to replicate a particular data item might be based on a then-current status of the data item and/or the manner in which the data item had been stored as a result of operation of a previous storage request. For example, a first data owner might require that a data item comprising "file F" (e.g., a copy of "Spiderman") is to be stored in a top tier of a multi-tier storage facility, whereas a different, second data owner might specify that its data item comprising "file F" (e.g., another identical copy of "Spiderman") is to be stored in a lowest tier of the same multi-tier storage facility. Data can be deduplicated by not storing a physical second copy of "Spiderman" in the lowest tier and, instead, merely indicating that the physical second copy of "Spiderman" that would have been stored in the lowest tier can be accessed from the copy in the top tier. If the top tier data item that is owned by the first data owner is ever deleted, then the copy that is stored in the lower tier is marked as owned by the second data owner.

In accordance with embodiments as disclosed herein, determination and operation of relationship-based storage instructions (e.g., to duplicate or not, and/or how and/or where to duplicate) serve to reduce computing resources required to serve multiple sites that have varying policies. Some embodiments issue relationship-based storage instructions to two or more data storage repositories. As the number of satellite sites and corresponding relationships to the data storage repositories increases, so increases the efficiency of the herein-disclosed deduplication system as a whole.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "P employs A or B" is intended to mean any of the natural inclusive permutations. That is, if P employs A, P employs B, or P employs both A and B, then "P employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A is a block diagram of an environment 1A00 in which systems for policy-based data deduplication can operate. As an option, one or more variations of environment 1A00 or any aspect thereof may be implemented in the context of the architecture and functionality of the embodiments described herein.

The environment 1A00 includes several producer sites 102 that communicate over a network 103 to a data storage site. The data storage site might be configured to function as a disaster recovery data repository, where any of the producer sites send their respective data items to the disaster recovery data repository in case some disaster or other situation raises a need for data to be restored at a producer site. In the context of forms of data deduplication that might be performed at the data storage site, it often happens that some data "X" might exist at more than one of the producer sites. For example, and as shown, each of the appended claims might host a respective copy of the film "Spiderman". In most cases, just one copy of "Spiderman" needs to be saved at the disaster recovery data repository. This is because, since each copy of "Spiderman" is exactly identical to every other copy, in the event of a need for data recovery at any one of the producer sites, any single copy of the film "Spiderman" can be used to restore "Spiderman" at the producer site.

However, it sometime happens that one site (e.g., site S1 142) has a different service level agreement (SLA) or different contract provisions or different restore point objectives or other codifications of a data storage relationship as compared to the other sites (e.g., site S2 144, site S3 146). This can happen when one or another site pays more for (for example) faster disaster recovery. It can also happen for other reasons that can be characterized in an SLA or other relationship information that is accessible to the data storage site. Continuing the "Spiderman" example, it might be that a deduplication operation at the data storage site receives or accesses metadata pertaining to the file "Spiderman" very infrequently. Recognizing that the file is only infrequently accessed, "Spiderman" becomes a good candidate to be stored at a lower tier of storage (e.g., at a cheaper, Tier2 of storage.). If another site submits a request (e.g., in context of a disaster recovery backup scenario) to store its copy of "Spiderman", the data storage site can determine that a copy of "Spiderman" already exists and need not be stored again, thereby performing deduplication by not storing another copy of "Spiderman".

The foregoing determination assumes that the one copy of "Spiderman" is sufficient to satisfy the SLAs of all of the data producer sites. This assumption might be a valid assumption, or it might not be a valid assumption. Suppose that the deduplication logic determined to store at the lower tier of storage would satisfy the SLA of the requesting site, but storage of that one occurrence of "Spiderman" in the lower tier or storage would violate another site's SLA, then that logic for deduplication is deficient, at least because the deficient logic fails to recognize variations in SLAs or other relationships between sites.

As shown, the relationship-based deduplication action determination logic 114 performs a test at switch 115 to determine if there is any variation with respect to the manner in which some particular data is to be stored. There could be many reasons why there is a variation in the manner in which some particular data is to be stored and, in some cases, the particular data is stored in a different manner than the manner in which an already existing deduplicated copy of the data exists at the central site 110. For example, it might happen that one of the producer sites 102 (e.g., site S1 142) might have a first SLA or relationship with the data storage site 105 that is different from the relationship between a second producer site and the data storage site. As such, even though there is an existing copy of "Spiderman" in the "Tier2" storage, the relationship-based deduplication action determination logic 114 might determine that an additional copy of "Spiderman" needs to be stored in "Tier1" storage, and thus, the "Path2 ($X_2$)" path is taken. On the other hand, if the relationship-based deduplication action determination logic 114 and or the logic of switch 115 determines (e.g., due to tenant partitioning constraints) that even though there is already a stored instance of "Spiderman" in "Tier2" storage, that another instance of "Spiderman" is to be stored in the remote data storage facility 120, then the "Path1 ($X_1$)" path is taken. A set of relationship-based storage instructions 104 are delivered to the remote data storage facility 120 such that the remote data storage facility 120 will store the instance of "Spiderman" in a manner that comports with the particular relationship and/or any applicable policies, and/or constraints and/or commitments pertaining to the particular relationship.

The relationship-based deduplication action determination logic 114 functions based on several system aspects such as are depicted in Table 1. Specifically, the relationship-based deduplication action determination logic might process a storage request based on topology where each site is a node of a topology graph, and/or relationships between nodes of the topology graph, and/or policies that are associated with any pairs of nodes and/or any rules that implement a policy or portion thereof.

TABLE 1

| System Aspect | Usage |
| --- | --- |
| Topology | Determines the presence of a relationship between one computing site relative to another computing site |
| Relationship | Specifies an aspect or name between two sites |
| Policy | Name that describes a particular set of rules |
| Rule | Specifies how a particular data item is to be handled |

In the specific environment of FIG. 1A, relationship information 130 can be received from any particular node, and then stored in a relationship database 132 at the central site, which in turn comprises a table that includes a relationship lookup value (e.g., a site identifier such as 'S1', 'S2', etc., as shown), which relationship lookup key corresponds to a particular policy or policies. A policy is a set of rules that are to be observed when performing deduplication operations. As shown, any particular policy (e.g., policy P1 pertaining to site S1) is composed of one or more rules, each of which rules are identified by a rule name (e.g., a rule named R1, a rule named R2, etc.). The rules in turn are codified and stored so as to be analyzed by a computing process. The relationship-based deduplication action determination logic 114 can process any number of sets of relationship information. As such, the shown three sets of relationship information (e.g., S1 relationship information, S2 relationship information, and S3 relationship information) are depicted merely for illustrative purposes so as to show how multiple instances of the same file (e.g., having the same checksum) might be processed differently based on different relationship information.

More particularly, the aforementioned relationship-based deduplication action determination logic 114 is capable of determining that a particular data item is a new, unique data item that is to be stored for the first time at the central site, or if a particular data item might already be stored at the central site, and thus deduplication is to be considered with respect to the relationship between the requestor and the central site. In some cases, the determination as to whether or not a particular data item is already in existence at the central site can be facilitated by a master directory 112 in which "fingerprints" or checksums of data items are stored for access by the relationship-based deduplication action determination logic 114.

For example, master directory 112 might be composed of entries of "fingerprints" or checksums. If a "fingerprint" or checksum for a particular data item exists in the master directory, then it follows that the particular data item exists in at least one storage location of the central site. As particular data items are processed by the central site, and/or as particular data items are removed from storage at the central site, the master directory 112 is updated accordingly. In some cases, the master directory includes pointers and/or attributes that correspond to the particular data item of each entry. As such, an access (e.g., by relationship-based deduplication action determination logic 114) can result in determination of not only where the data can be found but also how the data is stored. An entry in the master directory 112 can include any number of storage attributes of the particular data item. Strictly as one example, a storage attribute might indicate that the data can be found at the remote data storage facility 120, and/or that the data can be found in, for example, "Tier1" storage of the local data storage facility 118, and/or that the data can be retrieved using any one or more agents that are interfaced to a remote data storage facility.

Making the determination as to whether or not a particular data item is to be stored is based on not only the existence (or not) of the particular unique data item at the central site, but also based on at least some aspect of the aforementioned relationship as well as the existence (or not) of the particular unique data item at the central site.

The foregoing discussion of FIG. 1A includes the establishment and use of several tables and/or data structures that are used in ongoing deduplication operations. Such data structures and uses are discussed in further detail hereunder. In particular, the shown relationship-based deduplication logic 114 or any variations thereof may use the aforementioned data structures to achieve various outcomes that comport with policy-based data deduplication.

Figure 1B:
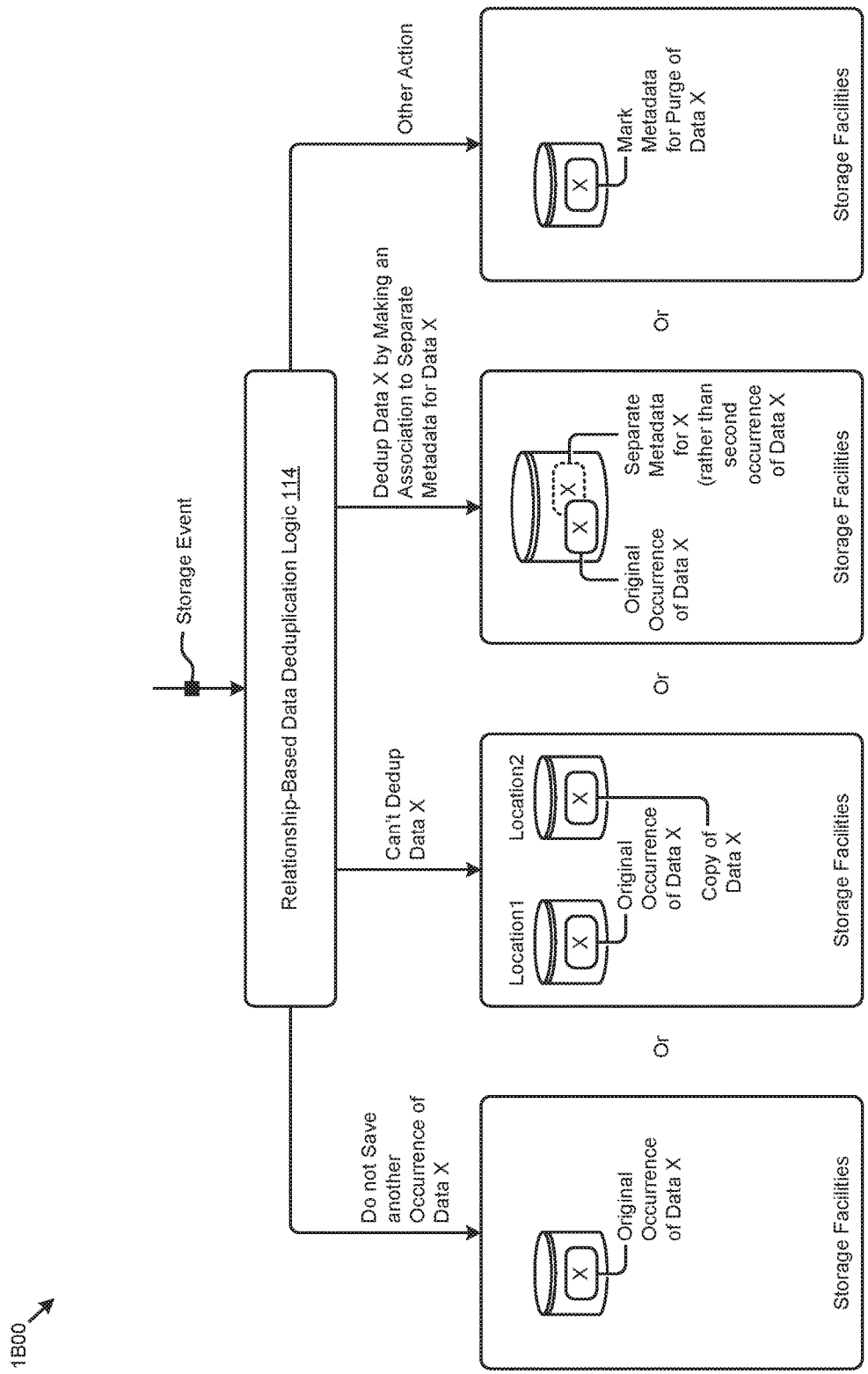
FIG. 1B is a schematic representation of how a storage event can be processed through relationship-based deduplication logic so as to implement policy-based data deduplication, according to an embodiment.

FIG. 1B is a schematic representation 1B00 showing how a storage event can be processed through relationship-based deduplication logic so as to implement policy-based data deduplication. Specifically, FIG. 1B depicts how a storage event can be processed through relationship-based deduplication logic 114 so as to implement policy-based data deduplication. As shown, when a storage event (e.g., store a file, store a block, etc.) is received, a determination is made as to how to process the storage event. In one situation shown as "Do not save another occurrence of data 'X'" the logic determines that an occurrence of 'X' (e.g., original occurrence of data 'X') is already stored in a storage facility in the manner that comports with characteristics of the storage event and/or the requestor, and thus another occurrence of data 'X' need not be stored.

There are situations where data deduplication is not indicated—such as when a requested storage event itself, and/or characteristics of the requestor, and/or characteristics of the relationship between the requestor and the storage facility—are such that the nature or characteristics of an original stored occurrence of data 'X' does not fully satisfy the requested storage event. In some such situations, data 'X' would need to be stored separately in the manner prescribed by the requested storage event itself, and/or by characteristics of the requestor, and/or by characteristics of the relationship between the requestor and the storage facility. For example, and as shown, an original occurrence of data 'X' is stored in a first location (e.g., Location1) and a copy of data 'X' is stored in a second location (e.g., Location2). Strictly as one example, the first location might be within "Tier1" storage area of the storage facility and the second location might be within "Tier2" storage area of the storage facility.

Further, there are situations where data deduplication can be accomplished while still honoring demands that derive from different characteristics of different data producers by merely storing separate metadata for data 'X'—without storing a second occurrence of data 'X'. Since metadata for any particular data item is often much smaller (e.g., $\frac{1}{1000}^{th}$ the size or $\frac{1}{100}^{th}$ the size or $\frac{1}{10}^{th}$ the size, etc.) that the data item itself, this is an efficient use of storage space.

Even still further, there are situations where the storage event is processed by the relationship-based deduplication logic 114 to accommodate efficient deletion of data that is no longer in use. One such situation is depicted by the "Other Action" path. Specifically, metadata associated with an occurrence of data 'X' is marked such that when there are no referrers to data 'X', it can be safely deleted. Other deduplication possibilities for handling a data item and/or its metadata are disclosed herein.

The aforementioned relationships of a requestor to or with a storage facility are merely one type of characteristic that can distinguish one data producer from another data producer. Other types might include contracts and/or provisions thereof, and/or subscriptions and/or provisions thereof, and/or contractual commitments, and/or storage policies or and/or storage commitments such as backup frequency policies, restore point policies/commitments, storage object handling rules, storage deduplication parameters, storage deduplication parameter values, etc. As such, the foregoing are merely examples of characteristics that might distinguish one data producer from another data producer.

Figure 2:
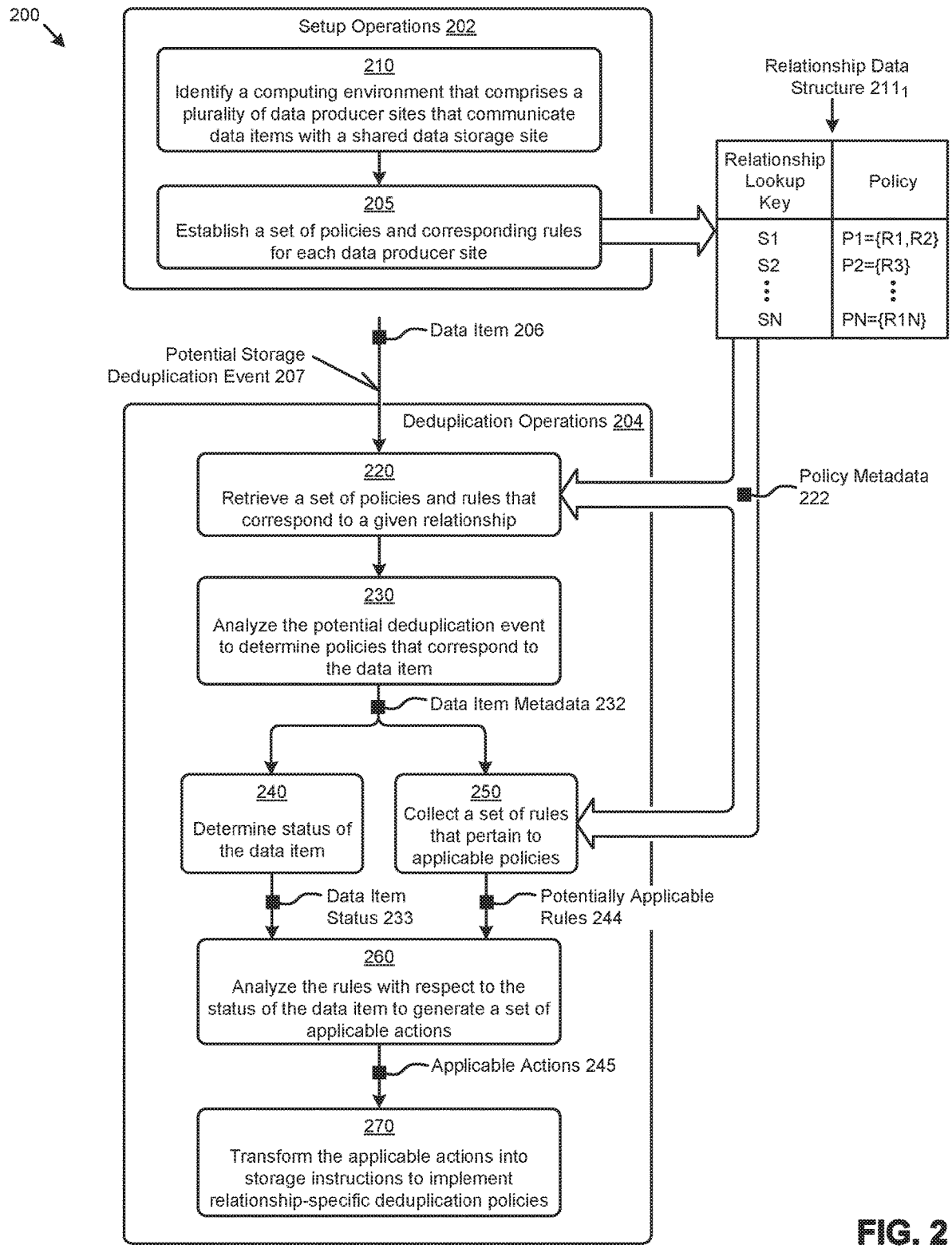
FIG. 2 is a diagram showing a data flow to implement policy-based data deduplication, according to an embodiment.

FIG. 2 is a diagram showing a data flow 200 to implement policy-based data deduplication. As an option, one or more variations of data flow 200 or any aspect thereof may be implemented in the context of the architecture and functionality of the embodiments described herein. The data flow 200 or any aspect thereof may be implemented in any environment.

The embodiment shown in FIG. 2 is merely one example. As shown, the data flow 200 is composed of setup operations 202 and ongoing deduplication operations 204. The setup operations 202 include mechanisms to identify a computing environment that comprises a plurality of data producer sites that communicate data items with a shared data storage site (step 210). Such identification can arise from a given topology map or other such data structure, and/or from registration operations carried out between nodes in the computing environment, and/or using any known technique. At step 205, any or all of the plurality of data producer sites can be populated into a column of a data structure such as the leftmost column of the shown relationship data structure $211_1$.

In another column of the relationship data structure $211_1$, some or all of the data producer sites may have a corresponding policy or set of policies. A policy or set of policies can be codified such as by referring to a policy by name (e.g., "P1", "P2", etc.), and/or by associating a policy name to a set of constituent rules (e.g., R1, R2, etc.). Irrespective of the mechanisms and/or techniques to populate the relationship data structure, ongoing data deduplication operations can derive policy metadata 222 directly or indirectly from the relationship data structure $211_1$.

As depicted in FIG. 1A and FIG. 1B, the data producer sites operate independently. Each data producer site might perform various backup operations (e.g., transmitting disaster recovery data to a disaster recovery data storage site), and any such transmission might include a data item 206 that raises a potential storage deduplication event 207.

Upon occurrence of a potential storage deduplication event, a flow comprising a set of deduplication operations is invoked. At step 220, the event is associated, directly or indirectly, with the originator of a block of data or range of data such that the block or range can be associated to an originating site or owner that is in turn associated with any of the one or more policies that were established in the setup operation 202. As an example, if a particular potential storage deduplication event is raised by a process of site "S1", then by performing a lookup operation over the relationship data structure, the pre-established association of "S1" to policy "P1" can be retrieved. The constituent rules of the associated policy (e.g., rule R1, rule R2) can be retrieved in the same access. In some cases, such as is depicted in FIG. 1A, the associations can be stored in a relationship database that is accessible to the relationship-based deduplication action determination logic 114. As such, the associations can be codified as a response to a query. In other cases, the entire relationship data structure is retrieved and policy metadata can be codified using any known technique that produces information about policies (e.g., policy metadata 222) that facilitates correlations between sites and policies, and/or processes and policies, and/or policies and rules, etc.

At step 230, aspects of the potential storage deduplication event are considered to determine whether or not a policy is applicable and, if so, which policy or policies are at least potentially applicable to the event. In many cases, when the potential storage deduplication event is deemed to indeed be subject to consideration with respect to a policy or policies, then metadata for the data that is the subject of the event is retrieved. As one example, any of the data item(s) (e.g., block or range of blocks) that pertain to the event can have associated data item metadata that is delivered with the event. In some cases, metadata can be generated and/or retrieved based on aspects of the event. For example, if an event pertains to block "X", the fingerprint or checksum of block "X" can be calculated and the fingerprint or checksum can be included together with or as a part of data item metadata 232.

Given the data item metadata, at step 240 the status of the underlying data item can be determined. For example, the aforementioned fingerprint or checksum can be compared against fingerprints or checksums in master directory 112. Performance of step 240 results in a data structure that characterizes the then-current state of the data item (data item status 233), which is used in subsequent processing. As shown, step 250 is performed concurrent with step 240. In step 250, policy metadata 222 is analyzed to determine a set of rules that are at least potentially applicable to the previously-retrieved policies.

The data item status 233 and the set of at least potentially applicable rules 244 are made available to subsequent processing. In the shown example, step 260 analyzes the set of potentially applicable rules 244 with respect to the status of the data item. In some cases, a rule is immediately applicable to a data item having a particular status. For example, if a rule states, "always store 'hot' data items in 'Tier1'", and the data item status includes a "hot" indication, then that data item should be stored in "Tier1". In other cases, it can happen that a rule is not definitively known to be applicable or not until all of the at least potentially applicable set of rules have been considered. (Further details pertaining to application of rules is given as shown and described as pertains to FIG. 7.)

Continuing with the discussion of FIG. 2, when the rules have been analyzed with respect to the status of the data item, then step 270 is entered. The applicable actions 245 are transformed into instructions that serve to implement the policies that pertain to the data item. For example, if policy "P1" includes rule "R1" to "always store 'hot' data items in 'Tier1'", and the subject data item "X" was deemed to be 'hot', then instructions having the semantics of "store data item "X" in Tier1 '" is emitted. Referring again to FIG. 1A, if the instruction, "store data item "X" in Tier1'" is issued to local data storage facility 118, then the local data storage facility would store the data item "X" in its Tier1 storage area, and/or with its Tier1 storage characteristics.

The foregoing discussion of FIG. 2 includes discussion of sites, policies and rules. The relationships between sites and policies, and the relationships between policies and rules, as well as example techniques for how to make and use such associations, are shown and discussed as pertains to FIG. 3.

Figure 3:
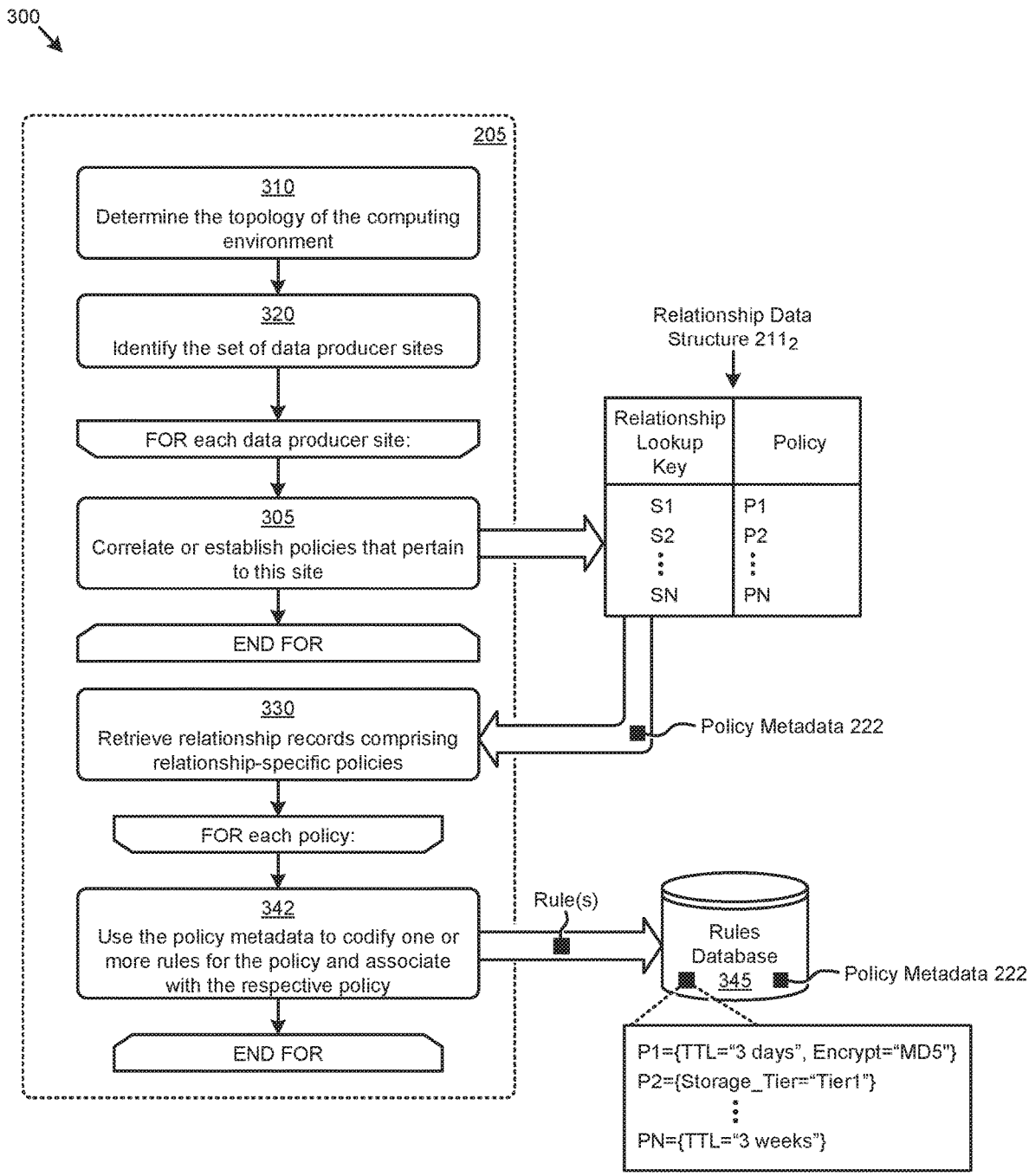
FIG. 3 is a data flow diagram depicting use of policy metadata and a rules database in a system for policy-based data deduplication, according to an embodiment.

FIG. 3 is a data flow diagram 300 depicting use of policy metadata and a rules database in a system for policy-based data deduplication. As an option, one or more variations of data flow diagram 300 or any aspect thereof may be implemented in the context of the architecture and functionality of the embodiments described herein. The data flow diagram 300 or any aspect thereof may be implemented in any environment.

The data flow diagram 300 includes steps for performance of the shown step 205. Step 205 (e.g., as introduced in FIG. 2) serves to establish relationships between data producer sites and policies and/or rules. As depicted in FIG. 3, it does this by carrying out a sequence of steps. Specifically, and as shown, the topology of a multi-site system is determined (step 310). This can be accomplished using any known technique. In some cases, a topology is given as a graph with nodes and edges. In other cases, topological relationships between data producer sites and a corresponding one or more data storage sites are given in a table.

At step 320, the topological semantics of the foregoing topological determinations are used to identify the set of data producer sites of the multi-site system. Next, for each identified site, step 305 serves to correlate or establish policies that pertain to a particular one of the sites. In some cases, a set of policies are known to be correlated to a particular site based on the existence of an SLA. In other cases, an administrator completes a form that assigns named policies to a site. Irrespective of the particular technique to process policies that pertain to a particular one of the sites, a data structure such as the shown relationship data structure 2112 is populated. When all of the data producer sites have been considered, then processing moves to steps that further populate the relationship data structure 2112 with rules for each policy.

Specifically, and as shown, step 330 serves to retrieve all or part of relationship data structure 2112, or step 330 serves to retrieve policy metadata 222 that is derived from relationship data structure 2112. For each named policy, and based on the union of the named policies that are so retrieved, any associations between a named policy and a set of constituent rules are determined. For example, if a named policy is "Platinum-level SLA" and the terms of the "Platinum-level SLA" include a provision to "restore within 12 hours", then an association between "Platinum-level SLA" and a rule such as "never store in remote data storage facility" is established.

Codification of such rules and techniques for forming associations between policies and codified rules can use any known techniques. Strictly as examples, the semantics of a rule can be codified in a markup language such as the extensible markup language (XML). Or, in some cases, a rule is coded as a predicate test such as an "IF" clause, and the "THEN" clause can be coded as an action to be taken when the predicate evaluates to TRUE. Step 342 is performed for each named policy. The result of performance of step 342 includes formation of a rules database 345. The rules database might include policy metadata 222 that holds a specific association between a named policy such as "P1" and any one or more rules. In the example shown, policy "P1" includes a rule "time to live (TTL) after deletion is 3 days" as well as another rule that specifies to "use MD5 for encryption".

The embodiment shown in FIG. 3 is merely one example flow of setup operations that result in correlations of particular producer sites to policies. The foregoing setup operations need not be specific to the level or granularity of a site. Rather, correlations to policies might be formed based on particular data types (e.g., a .DOCX document, or a .MOV document, etc.) and respective data-specific policies. Or, in some embodiments, correlations to policies might be formed based on characteristics of an entity (e.g., an agency, a clearinghouse, etc.) and respective entity-based policies. Or, correlations to policies might be formed based on characteristics of an individual and/or his or her roles (e.g., a manager role, an employee role, etc.) and respective role-based policies. Still further, correlations to policies might be formed based on characteristics of a spending objective or performance objective.

When all or portions of the setup operations have been initiated and/or completed so as to correlate a source to one or more policies, and/or when all or portions of the setup operations have been initiated and/or completed so as to populate a database of rules and policy metadata, then incoming events raised by the sources can be analyzed with respect to such rules and policy metadata. One technique for event analysis is given in the following FIG. 4.

Figure 4:
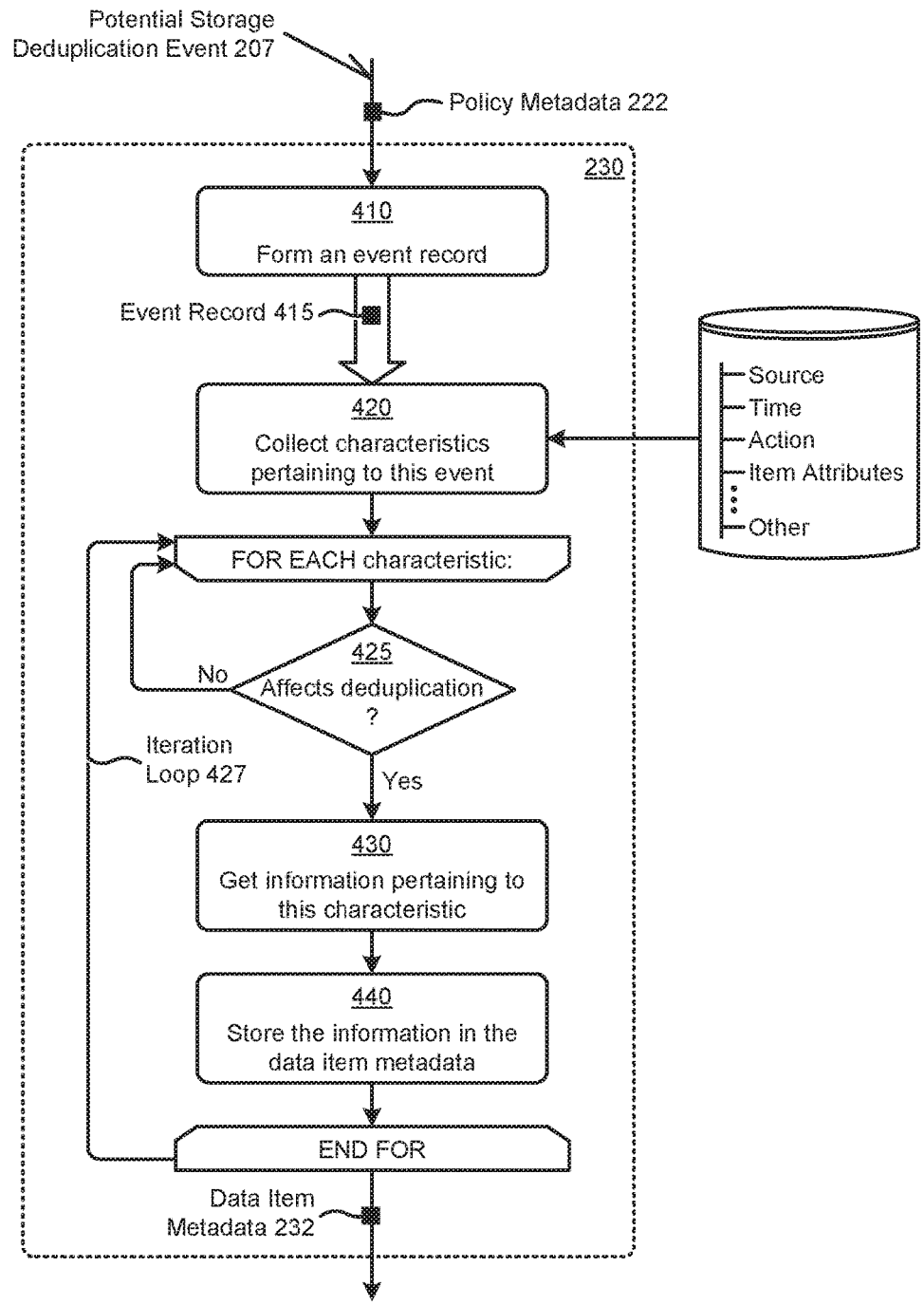
FIG. 4 is a data flow diagram showing an event analysis flow as used in systems that perform policy-based data deduplication, according to an embodiment.

FIG. 4 is a data flow diagram showing an event analysis flow 400 as used in systems that perform policy-based data deduplication. As an option, one or more variations of event analysis flow 400 or any aspect thereof may be implemented in the context of the architecture and functionality of the embodiments described herein. The event analysis flow 400 or any aspect thereof may be implemented in any environment.

The event analysis flow 400 results in generation of metadata that characterizes the event type as well as any other information that would be at least potentially used for making deduplication decisions. In previous processing (e.g., in step 220) a potential storage deduplication event 207 and a corresponding data item are used to retrieve applicable policy metadata. Such policy metadata might or might not be sufficient to make downstream deduplication decisions. As such, the shown event analysis flow 400 serves to collect additional information. In this embodiment, step 410 forms an event record 415 based at least in part on an occurrence of a potential storage deduplication event 207. In some cases a potential storage deduplication event might be a storage I/O command (e.g., WRITE I/O command) and, as such, the storage I/O command might be given in a particular format, which might not, by itself, include enough information to make downstream deduplication decisions. Therefore, step 420 through step 440, including decision 425 and the iteration loop 427 are performed so as to collect and codify data item metadata 232, which in turn is used in making downstream deduplication decisions.

Specifically, at step 420 a table or other data item is accessed to determine a set of characteristics that at least potentially apply to making downstream deduplication decisions based on the potential storage deduplication event 207. Strictly as examples, such characteristics might include the source of the event, the time of the event, the action or actions that explicitly or implicitly pertain to the event, and/or a set of attributes that pertain to the data item to be considered for deduplication. For each such retrieved characteristic, decision 425 is taken to determine if the characteristic and/or its value is at least potentially applicable to making downstream deduplication decisions. If not, the "No" branch of decision 425 is taken. Otherwise, the "Yes" branch of decision 425 is taken and step 430 is entered to collect information pertaining to the characteristic of the then-current iteration. Strictly as an example, information that might pertain to a source characteristic might be the site name or requestor's name. As another example, information that might pertain to a time characteristic might be codified as a timestamp or sequence control number of the particular even being considered. Still further, information that might pertain to the data item itself might include a fingerprint, encryption-related information, etc. At step 440, while information such as the foregoing is collected, the information is codified and stored as data item metadata. The iteration loop proceeds over all of the characteristics that were collected in step 420. When the iteration loop exits, data item metadata 232 is ready to be presented to or for downstream processing.

Returning again to the discussion of the potential storage deduplication event 207 and collection of characteristics of the event, the incoming event might be raised by a data producer that seeks to push a data item to the storage site (e.g., for disaster recovery purposes), or the incoming event might be raised by an agent in the storage site that seeks to purge a data item based on expiration of a data retention policy. Each of these two cases can be determined by analyzing the event and/or any data pertaining to the event. More specifically, information pertaining to the event might be received in or with the event indication. For example, an event might be raised after a data producer site sends backup data to the data storage site. Such backup data might be sent along with, or as a part of, a message that is transmitted over a network. As another example, an event might be raised after an agent at the data storage site invokes a subroutine at the data storage site. Such a subroutine might include an explicit indication of the type of event (e.g., a data retention purge event indication value). Or information pertaining to the event might be implied based at least in part on the name or occurrence of the invoked subroutine. In some embodiments, certain portions of metadata for the particular data item might be included in or with a message that raises the event. In other cases, the metadata or portions thereof for the particular data item is retrieved from any available repository, possibly from a cache.

Upon completion of the iteration loop, which coincides with the conclusion of step 230, processing is passed to downstream processing. Specifically, and as shown in FIG. 2, after completion of step 230, step 240 retrieves or calculates a status indication for the data item. Such a status indication, in combination with a set of rules pertaining to the data item and/or its status is used to determine applicable actions 245 to take. One possible technique for retrieving or calculating a data item status is given in FIG. 5.

Figure 5:
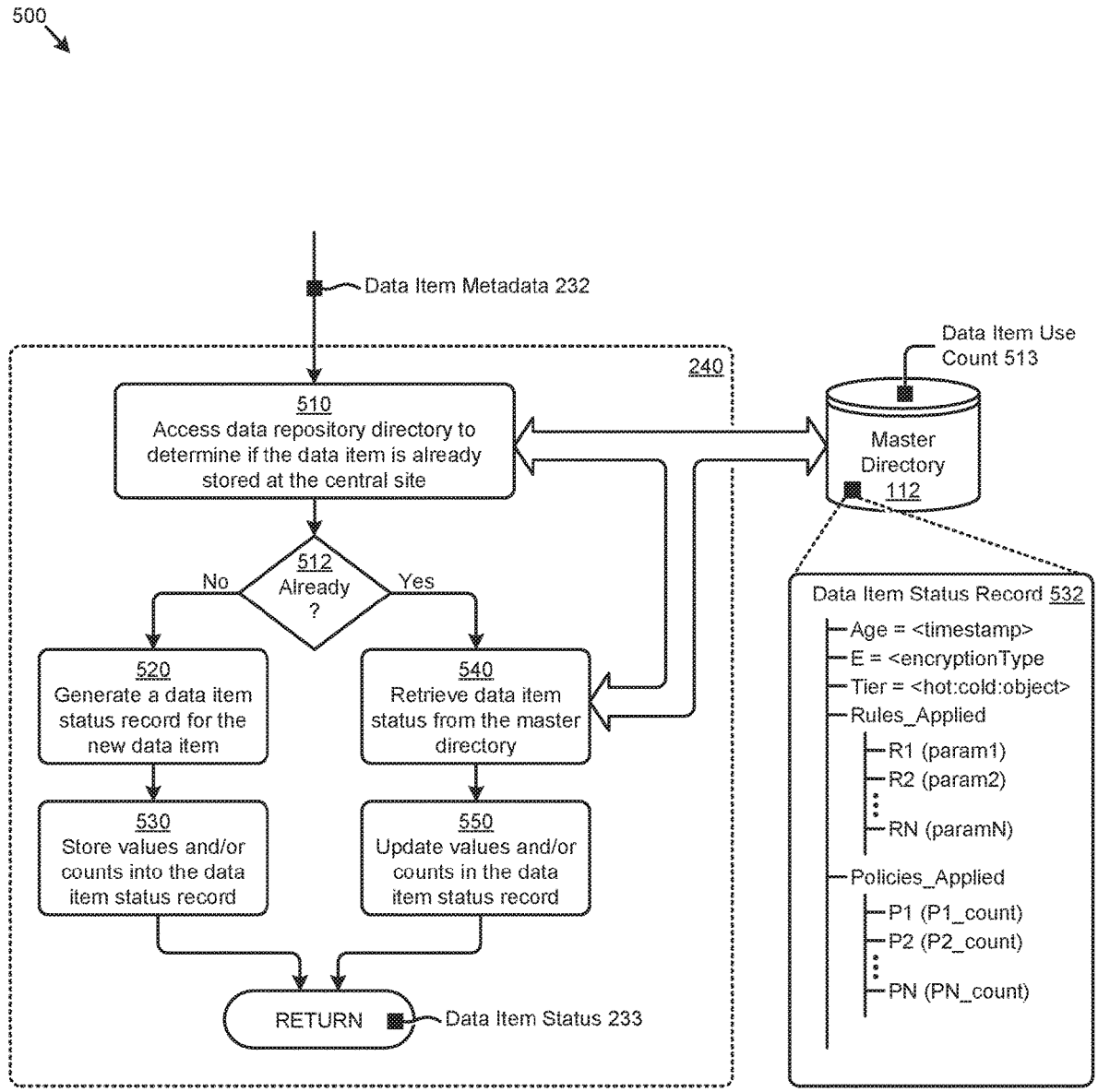
FIG. 5 is a data flow diagram showing a data item status determination technique as used in systems that perform policy-based data deduplication, according to an embodiment.

FIG. 5 is a data flow diagram showing a data item status determination technique 500 as used in systems that perform policy-based data deduplication. As an option, one or more variations of data item status determination technique 500 or any aspect thereof may be implemented in the context of the architecture and functionality of the embodiments described herein. The data item status determination technique 500 or any aspect thereof may be implemented in any environment.

The embodiment shown in FIG. 5 is merely one example. As shown, the data item status 233 determination technique includes step 510 to access the master directory. If the master directory includes an occurrence of a record with status information pertaining to the particular data item, then at decision 512, the "Yes" path is taken. The data item that is identified by a matching fingerprint or checksum is retrieved at step 540. Step 550 serves to update the values and/or counts in the data item's corresponding data item status record.

In some embodiments, the number of uses of a particular data item (e.g., the shown data item use count 513) is stored in a master directory. Such a use count can be considered when deciding to delete a particular data item occurrence. For example, suppose that many sites had raised an event to store "Spiderman", it might be that only one occurrence of "Spiderman" was actually stored. Suppose further that a particular one of those sites raised a request to delete "Spiderman". That request could be satisfied so long as the other sites no longer reference "Spiderman". To keep track of how many referrers expect to be able to retrieve "Spiderman", a master directory might keep a correspondence between a particular data item (e.g., "Spiderman") and the number of referrers. Only after the last referrer indicates a deletion request can the occurrence of "Spiderman" actually be deleted.

The foregoing discussion includes operations for recording counts. In some cases, counts can be used to determine if there are any referrers. Counts can also be used to determine which policies apply to a given data item. Such counts can be included as a data item used count 513 that is stored in the master directory (e.g., in some association to the underlying data item), or can be stored in or with occurrences of a data item status record 532. When the "No" branch of decision 512 is taken, then at step 520, a data item status record is generated for a new data item (e.g., a new data item for which the master directory does not contain a corresponding data item status record). Also, at step 530, the counts pertaining to the particular instance of a data item status record that was generated in step 520 are stored. Processing of step 520 and step 530 occurs when decision 512 determines that the incoming data item does not already exist in the master directory, specifically, the "No" path of decision 512 is taken, at which time step 520 and step 530 serve to generate and populate a status record for the data item. As shown, status records are stored in the master directory 112.

Moreover, any aspects of the data item (e.g., aspects that are given in the data item metadata) can be retrieved/stored from/in a record of the master directory. This record (e.g., data item status record 532) of the data item metadata is periodically updated in the master directory to reflect the then-current status as deemed by the storage site. This is shown in the example with respect to the "Age" characteristic. The "Age" characteristic can hold a value of a timestamp referring to a last access (e.g., last WRITE or last DELETE). Such a timestamp and a TTL can be used in combination with data retention rules to determine if a particular data item should be purged (e.g., upon the expiration of a TTL or retention period). Additionally, data records as stored in the master directory might keep track of policies that had been applied, together with their respective use counts. As such, one embodiment of a data item status record 532 might include a list of policies that have been applied, together with any deduplication rules or other storage rules and/or deduplication rules or other storage parameters that were used when applying the rule.

Strictly as one example of tracking policies together with their respective use, consider the situation where a first site applies a policy that includes retention of a particular data item through 1/1/2055. Further consider that a second site applies a policy that includes retention of the same particular data item through 1/1/2054. It can be understood that retention through 1/1/2055 satisfies retention through 1/1/2054, and thus, rather than applying a first policy for retention through 1/1/2055 and another policy for retention through 1/1/2054, systems in accordance with the disclosure herein can achieve deduplication by promoting the particular data item to be retained through 1/1/2054 by merely referring to the data item that is stored for retention through 1/1/2055. A policy reference count might be incremented to reflect another occurrence of that policy being in force for that particular data item.

The foregoing is merely one example of a count being applied to a particular policy. Other situations call for a count being applied to a particular rule. In some cases, and as shown, an applicable rule is stored in a master directory 112 that comprises one or more data item status records together with corresponding one or more parameters. The single master directory 112 as shown can hold any number of data item status records. Alternatively, a master directory can be formed of data that is distributed throughout any number of nodes of a computing system. In some cases, a logical master directory can be formed of data that is physically distributed across any number of computing nodes. Further, a logical master directory can be formed of data that is physically distributed across any number of computing nodes in a storage pool that is itself a logical construction of storage areas attached to any number of computing nodes, which storage pool can be accessed as a single large storage area comprised of contiguous storage extents.

One result of the foregoing flow derives from processing of step 540 or of step 550. Specifically, at the conclusion of processing the flow of data item status determination technique 500, a data item status 233 is emitted. The data item status 233 might comprise all or part of the data item status record. Accordingly, such a data item status can be used to collect rules which in turn are used in making decisions pertaining to policy-based data deduplication. One possible rule collection technique is given in FIG. 6.

Figure 6:
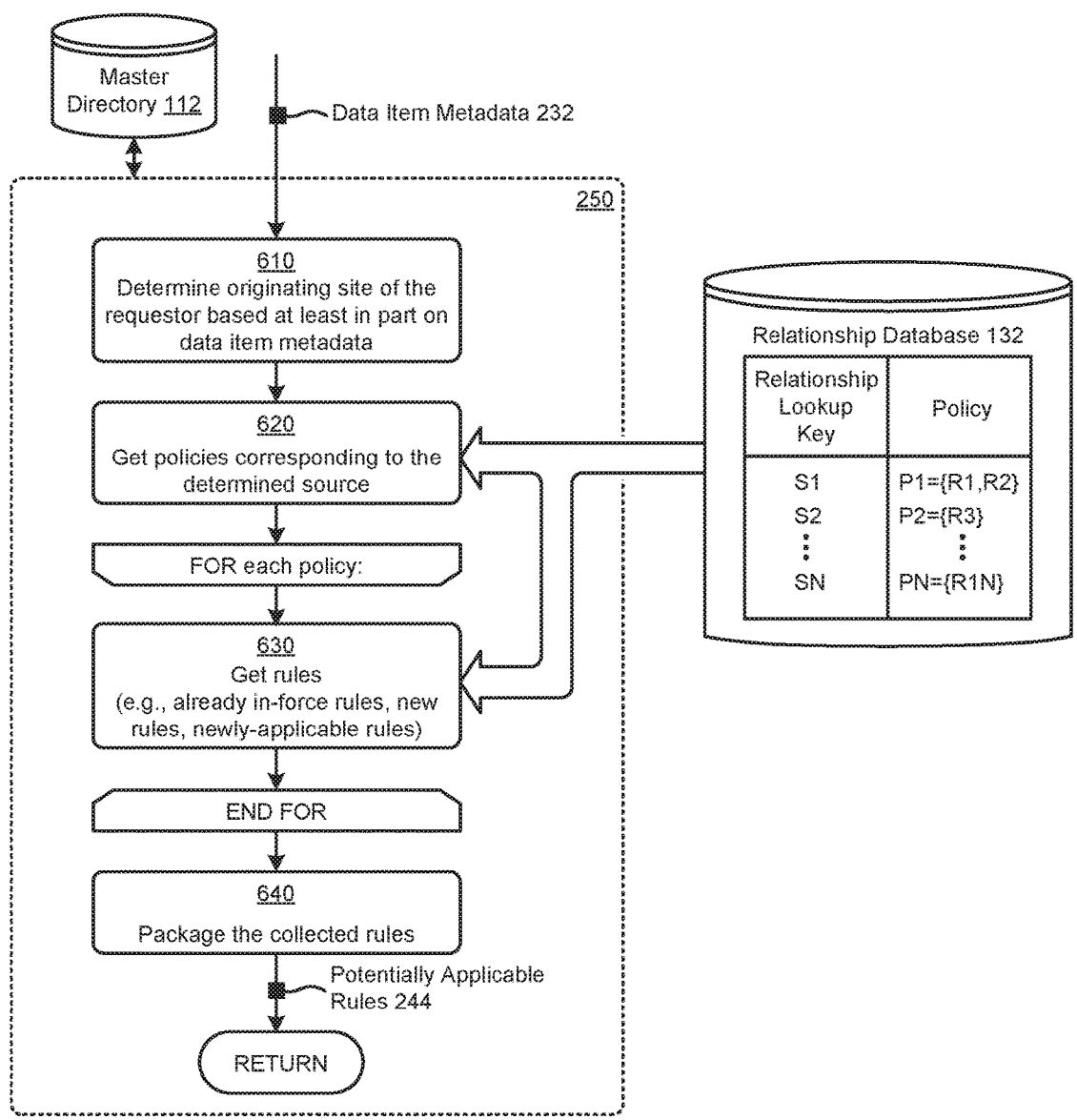
FIG. 6 is a data flow diagram showing a rule collection technique as used in system that performs policy-based data deduplication, according to an embodiment.

FIG. 6 is a data flow diagram showing a rule collection technique 600 as used in system that performs policy-based data deduplication. As an option, one or more variations of rule collection technique 600 or any aspect thereof may be implemented in the context of the architecture and functionality of the embodiments described herein. The rule collection technique 600 or any aspect thereof may be implemented in any environment.

The rule collection technique 600 of FIG. 6 is merely one embodiment. This particular embodiment implements step 250, which step follows performance of the foregoing step 220 and step 230 of deduplication operations 204. In this embodiment, an incoming occurrence of data item metadata 232 and the master directory 112 are used in combination to collect all of the policies and corresponding rules that would at least potentially apply to the data item corresponding to the aforementioned incoming data item metadata. Step 610 determines the source of the data item. In some cases, it does this by accessing the data item metadata and locating a field that describes the source (e.g., data producer site) of the data item. In other cases, it does this by accessing a separate database that relates a particular event to a respective source (e.g., data producer site).

At step 620, relationship database 132 is accessed so as to retrieve the policies that correspond to the identified site. Then, for each policy that corresponds to the site, a set of applicable rules are amalgamated (step 630). The amalgamated rules can include all forms of rules that are at least potentially applicable. For example, the amalgamated rules might include rules that have already been applied, rules that are included in a policy but have not yet been applied, and/or any rules that are at least potentially applicable to one of the policies for the particular site. At step 640, such an amalgamation is codified as the shown set of potentially applicable rules 244.

In some cases, two different rules might be wholly or partially in conflict with each other. Accordingly, the full set of potentially applicable rules 244 are to be analyzed to identify conflicts, the nature of such conflicts (if any), and to determine how to reconcile conflicts in the context of a data deduplication system. One possible rule analysis technique is shown and described as pertains to FIG. 7.

Figure 7:
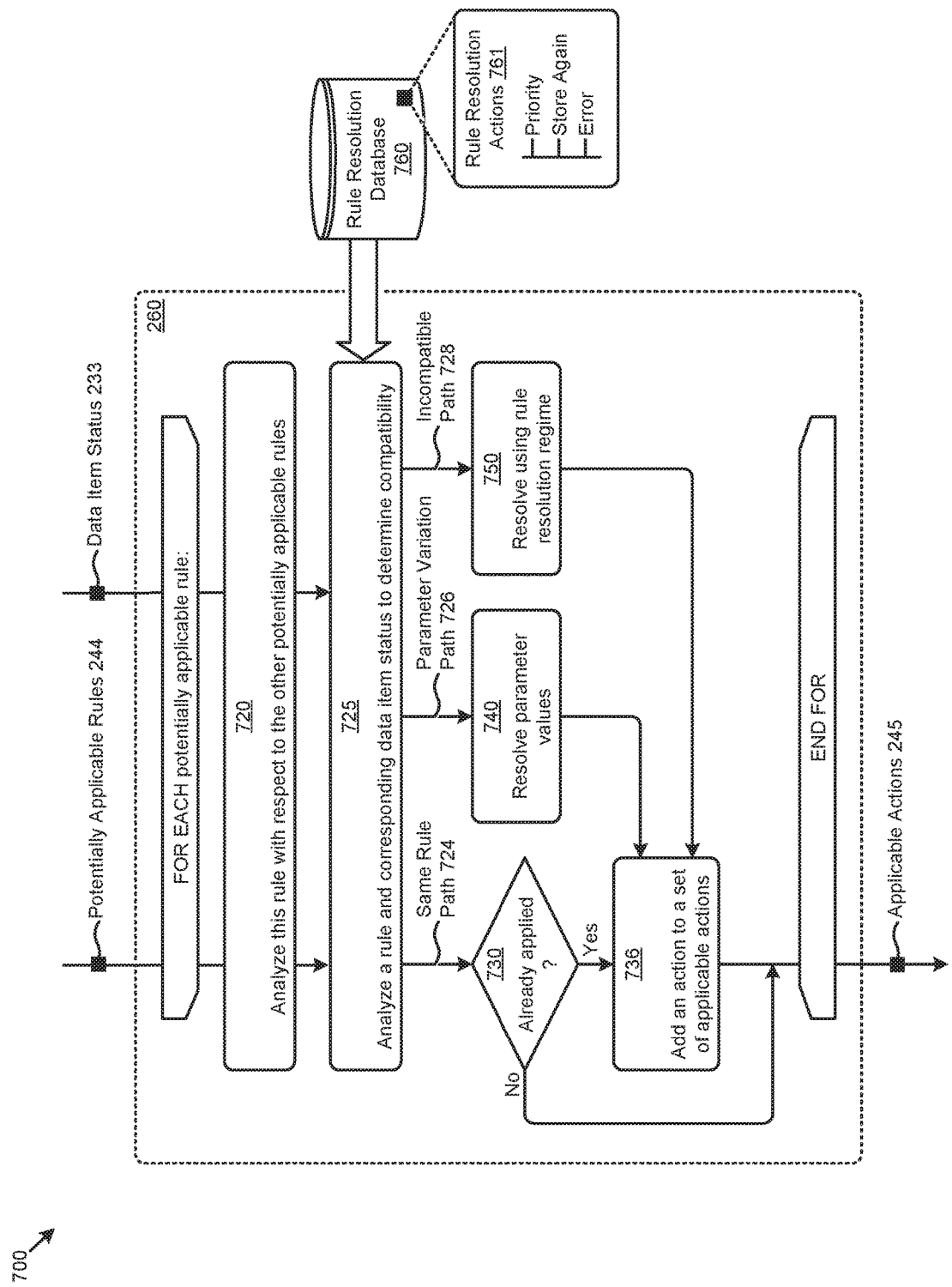
FIG. 7 is a data flow diagram showing a rule analysis technique as used in systems that perform policy-based data deduplication, according to an embodiment.

FIG. 7 is a data flow diagram showing a rule analysis technique 700 as used in systems that perform policy-based data deduplication. As an option, one or more variations of rule analysis technique 700 or any aspect thereof may be implemented in the context of the architecture and functionality of the embodiments described herein. The rule analysis technique 700 or any aspect thereof may be implemented in any environment.

As earlier indicated, the full set of potentially applicable rules are analyzed to identify any potential conflicts and to determine how to reconcile such conflicts. Conflicts can arise in several situations, for example when two rules are logically incompatible, or when two rules are logically compatible, but have different parameter values. Of course, it is also possible that a particular full set of potentially applicable rules might include rules that are not in conflict, and/or that have already been applied. The rule analysis technique 700 produces a set of applicable actions 245, which set of applicable actions is used in subsequent processing.

There are many reasons why application of a particular rule might be in conflict with another rule and/or the are many reasons why actions or states that derive from application of one particular rule might be in conflict with actions that ensue from a different rule. The flow of FIG. 7 resolves to actions that avoid persisting conflicts. Table 2 describes several rule resolution scenarios.

tially applicable rule can be in conflict with another potentially applicable rule. In such cases, one or another rule is to be accepted, or one or both rules are to be modified to remove the conflict. For example, if a rule being considered in the current iteration carries the semantics of "Save with 21 day retention" and another one of the potentially applicable rules carries the semantics of "Save with 3 day retention", then the rule with the semantic meaning of "Save with 21 day retention" can be selected. The other rule with the semantic meaning of "Save with 3 day retention" can be rejected because the rule with the semantic meaning of "Save with 3 day retention" is satisfied by the rule with the semantic meaning of "Save with 21 day retention".

In some cases, a rule conflict might not become apparent until the corresponding data item status is analyzed with respect to the rule of the current iteration. Such conditions are handled by processing within step 725. Strictly as an example, a rule with the semantics of "Do not comingle Tenant1 data with other data owners" might be violated if a save operation were performed on the data item such that the data item were to be stored in a storage area where there already existed data of other tenants besides "Tenant1". In such a case, even though it might be possible to deduplicate the data item (e.g., due to a data item with the same fingerprint or checksum already being stored), to observe the rule "Do not comingle Tenant1 data with other data owners", the data item would need to be stored again in a different storage area. The foregoing is merely one example. There are other situations where conflicting or potentially conflicting rules can be resolved through other actions. As shown, a rule resolution database 760 includes rule resolution actions 761, which rule resolution actions might include resolving conflicts by applying a priority to each rule and choosing the rule with the higher priority. In some cases, rule conflicts cannot be resolved without administrative intervention. In such cases, an error can be emitted, and an administrator can take remedial action.

In most cases, however, conflict variations between rules and/or conflicts between a rule and pre-existing conditions can be resolved by processing of step 725. Three possible

TABLE 2

Rule resolution scenarios

| Subject Rule or Action | Data Item Status (from previously-applied rule) | Determination/Action |
| --- | --- | --- |
| Save in "Tier1" storage | Saved in "Tier1" storage | No incompatibility, already being saved in "Tier1" satisfies both rules. |
| Parameter "cold" in a rule emits an instruction to save in "cold" storage | Already saved in "hot" storage | Observe the higher-performance parameter, (e.g., promote to a higher performance tier) and indicate saved in "hot" storage in the master directory. |
| Save with "21 day" retention | Save with "3 day" retention | Observe less restrictive parameter. Indicate "21 day" retention in the master directory. |
| Do not comingle "Tenant1" data with other data owners | This block has already been stored for "Tenant2" | Save this block in a separate storage area for "Tenant1". Indicate block ownership in the master directory. |

Any of the determinations and/or actions to be taken in a particular scenario can be codified as rule resolution actions 761 that are stored in a rule resolution database 760 that is accessible to any of the operations of rule analysis technique 700.

The processing of rule analysis technique 700 includes iterating through each of the potentially applicable rules. Step 720 analyses the rule of the current iteration against the other potentially applicable rules. In some cases, one potenpaths are shown in FIG. 7. As shown, one path (same rule path 724) continues processing at decision 730 to determine if that rule had already been processed. For example, if the rule is stated as "Save in tier1 storage" and a data item with the same fingerprint or checksum had already been stored in tier1 storage, then the rule for that data item had already been performed, and need not be performed again. On the other hand, if step 720 or step 725 identifies a parameter variation between rules, then parameter variation path 726 is taken so as to resolve parameter values in accordance with operations of step 740. Example cases for resolving parameter value variations are given in the examples given in Table 2 and corresponding discussion.

In yet another case, as indicated by incompatible path 728 and step 750, it is possible that two rules and/or a rule and a previous state are of a sufficiently incompatible nature that the rule resolution database is consulted. One or more rule resolution actions 761 can be taken so as to reconcile the incompatibility.

Any or some or all of the iterations, through decision 730 and/or step 740 and/or step 750 might include a step (step 736) to add another action into a set, so as to amalgamate a set of applicable actions. When all iterations have completed, the FOR EACH loop ends, and the amalgamated set of applicable actions 245 is provided to downstream processing.

Figure 8:
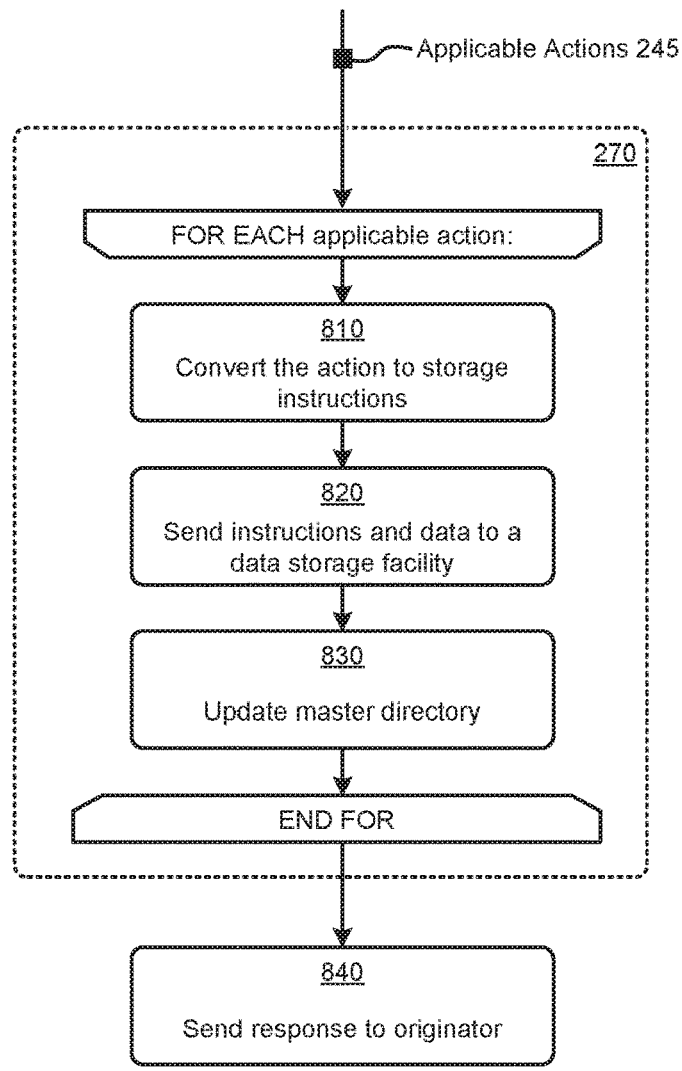
FIG. 8 is a diagram depicting a storage instruction dispatch technique for use in systems that implement policy-based data deduplication, according to an embodiment.

FIG. 8 is a diagram depicting a storage instruction dispatch technique 800 for use in systems that implement policy-based data deduplication. As an option, one or more variations of storage instruction dispatch technique 800 or any aspect thereof may be implemented in the context of the architecture and functionality of the embodiments described herein. The storage instruction dispatch technique 800 or any aspect thereof may be implemented in any environment.

When all of the rules and/or conditions have been deemed to be compatible, or have been reconciled, then applicable actions can be taken over the data item. In some cases, the data item is merely discarded since it can be deduplicated (e.g., not stored again). In other cases, action is taken over the data item in accordance with any/all of the compatible rules or reconciled deduplication rules or reconciled deduplication parameters. At step 810, an action is converted into a storage command or other form of instruction to be sent to any of the available storage facilities. In some cases, converting an action into a storage command or instruction is performed by matching the THEN clause of a rule into the syntax of a storage command. For example, a rule that includes the clause, "store data item "X" in 'Tier1'" might be converted to a storage command of the form "WRITE (/dev/A, loc (X), 1, BlockStart (1025))", where "WRITE" is a command verb, "dev/A" specifies the storage device or facility, "loc(X)" is the location of the data item "x", and "1" is the number of blocks to write.

At step 820, an action can be transformed or converted into a storage command, and the storage command is sent to the intended storage facility. In some cases, the storage facility is centralized such as local data storage facility 118. In other cases, the storage facility may be in a remote location, such as at or within or accessed through remote data storage facility 120. The action taken and/or the effect of the action taken is indicated in the master directory. For example, at step 830, if the action taken was to WRITE the data block to remote storage, then the master directory might be updated to contain an entry that indicates that "X" has been stored in the remote facility. After the set of applicable actions have been processed, then at step 840, a response indicating status and completion of the relationship-based deduplication action is sent to the originator of the storage request.

ADDITIONAL EMBODIMENTS OF THE DISCLOSURE

Additional Practical Application Examples

Figure 9A:
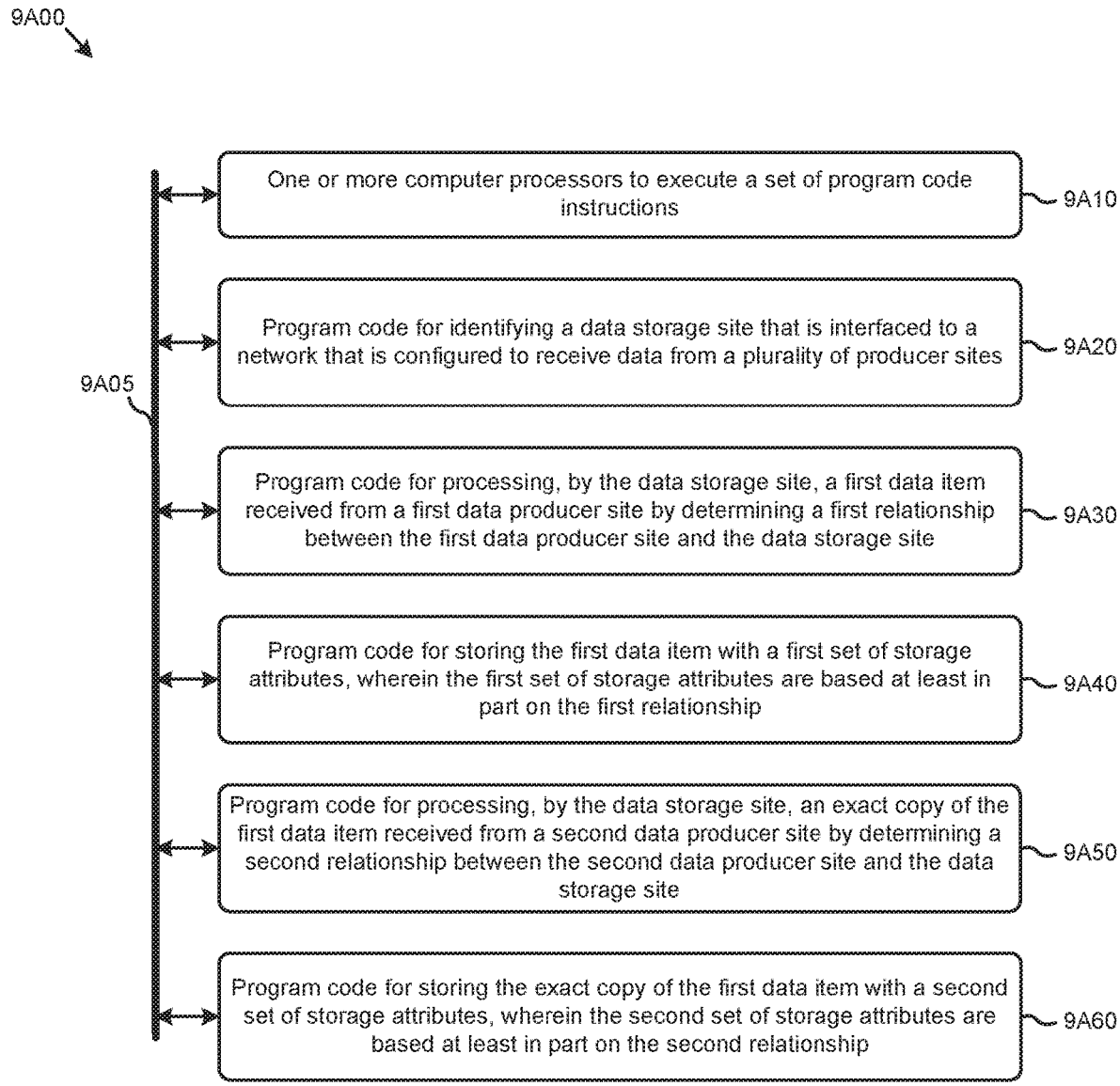
FIG. 9A and FIG. 9B depict system components as arrangements of computing modules that are interconnected so as to implement certain of the herein-disclosed embodiments.

FIG. 9A depicts a system 9A00 as an arrangement of computing modules that are interconnected so as to operate cooperatively to implement certain of the herein-disclosed embodiments. This and other embodiments present particular arrangements of elements that, individually and/or as combined, serve to form improved technological processes that address making decisions to replicate a block of data or not to replicate a block of data to a storage repository based merely on a fingerprint or other measure of uniqueness of the data in the block are too coarse. The partitioning of system 9A00 is merely illustrative and other partitions are possible. As an option, the system 9A00 may be implemented in the context of the architecture and functionality of the embodiments described herein. Of course, however, the system 9A00 or any operation therein may be carried out in any desired environment.

The system 9A00 comprises at least one processor and at least one memory, the memory serving to store program instructions corresponding to the operations of the system. As shown, an operation can be implemented in whole or in part using program instructions accessible by a module. The modules are connected to a communication path 9A05, and any operation can communicate with other operations over communication path 9A05. The modules of the system can, individually or in combination, perform method operations within system 9A00. Any operations performed within system 9A00 may be performed in any order unless as may be specified in the claims.

The shown embodiment implements a portion of a computer system, presented as system 9A00, comprising one or more computer processors to execute a set of program code instructions (module 9A10) and modules for accessing memory to hold program code instructions to perform: identifying a data storage site that is interfaced to a network that is configured to receive data from a plurality of producer sites (module 9A20); processing, by the data storage site, a first data item received from a first data producer site by determining a first relationship between the first data producer site and the data storage site (module 9A30); storing the first data item with a first set of storage attributes, wherein the first set of storage attributes are based at least in part on the first relationship (module 9A40); processing, by the data storage site, an exact copy of the first data item received from a second data producer site by determining a second relationship between the second data producer site and the data storage site (module 9A50); and storing the exact copy of the first data item with a second set of storage attributes, wherein the second set of storage attributes are based at least in part on the second relationship (module 9A60).

Variations of the foregoing may include more or fewer of the shown modules. Certain variations may perform more or fewer (or different) steps, and/or certain variations may use data elements in more, or in fewer (or different) operations.

Still further, some embodiments include variations in the operations performed, and some embodiments include variations of aspects of the data elements used in the operations.

Figure 9B:
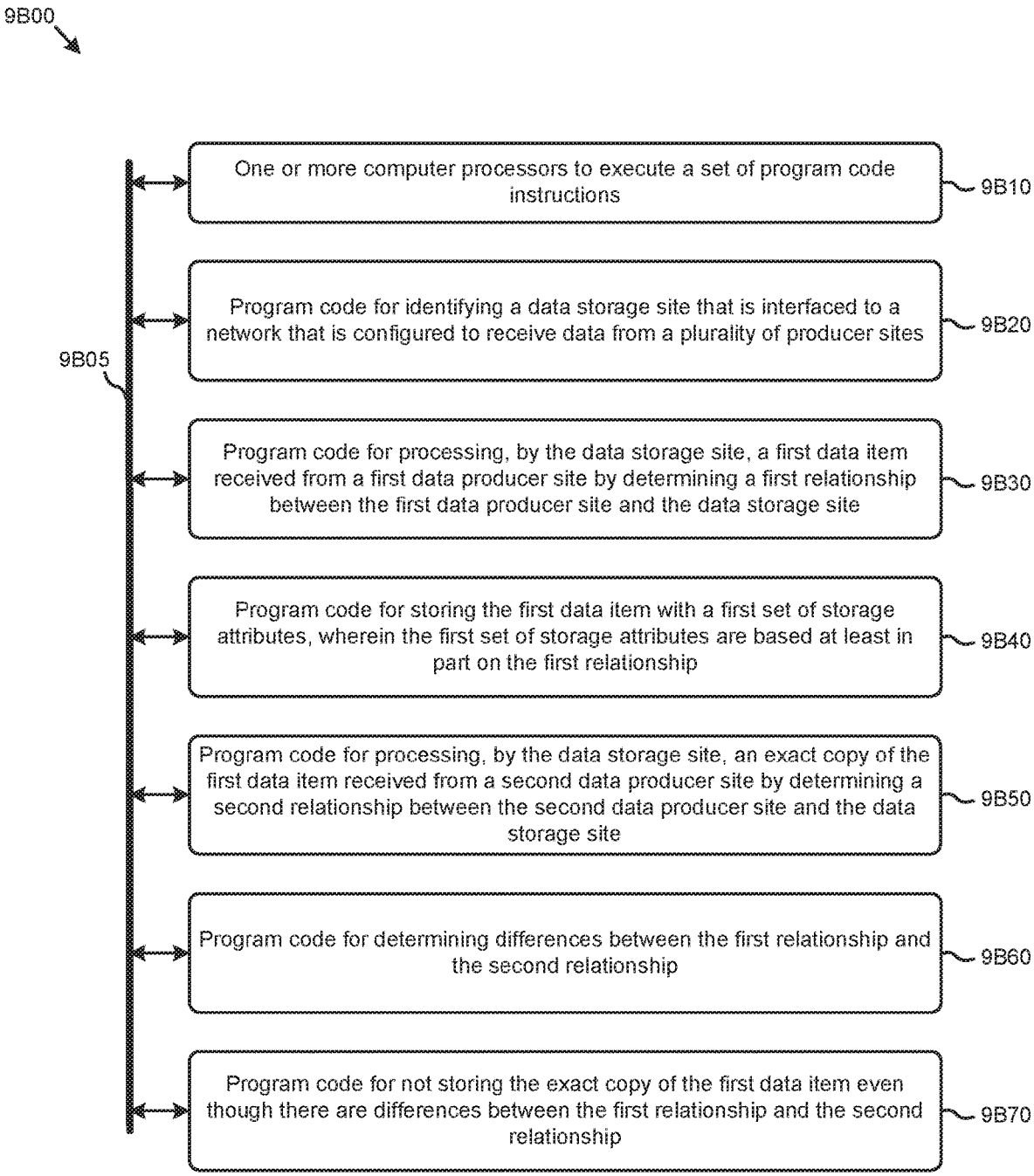

FIG. 9B depicts a system 9B00 as an arrangement of computing modules that are interconnected so as to operate cooperatively to implement certain of the herein-disclosed embodiments. The partitioning of system 9B00 is merely illustrative and other partitions are possible. As an option, the system 9B00 may be implemented in the context of the architecture and functionality of the embodiments described herein. Of course, however, the system 9B00 or any operation therein may be carried out in any desired environment.

The system 9B00 comprises at least one processor and at least one memory, the memory serving to store program instructions corresponding to the operations of the system.

As shown, an operation can be implemented in whole or in part using program instructions accessible by a module. The modules are connected to a communication path 9B05, and any operation can communicate with other operations over communication path 9B05. The modules of the system can, individually or in combination, perform method operations within system 9B00. Any operations performed within system 9B00 may be performed in any order unless as may be specified in the claims.

The shown embodiment implements a portion of a computer system, presented as system 9B00, comprising one or more computer processors to execute a set of program code instructions (module 9B10) and modules for accessing memory to hold program code instructions to perform: identifying a data storage site that is interfaced to a network that is configured to receive data from a plurality of producer sites (module 9B20); processing, by the data storage site, a first data item received from a first data producer site by determining a first relationship between the first data producer site and the data storage site (module 9B30); storing the first data item with a first set of storage attributes, wherein the first set of storage attributes are based at least in part on the first relationship (module 9B40); processing, by the data storage site, an exact copy of the first data item received from a second data producer site by determining a second relationship between the second data producer site and the data storage site (module 9B50); determining differences between the first relationship and the second relationship (module 9B60); and not storing the exact copy of the first data item even though there are differences between the first relationship and the second relationship (module 9B70).

System Architecture Overview

Additional System Architecture Examples

Figure 10A:
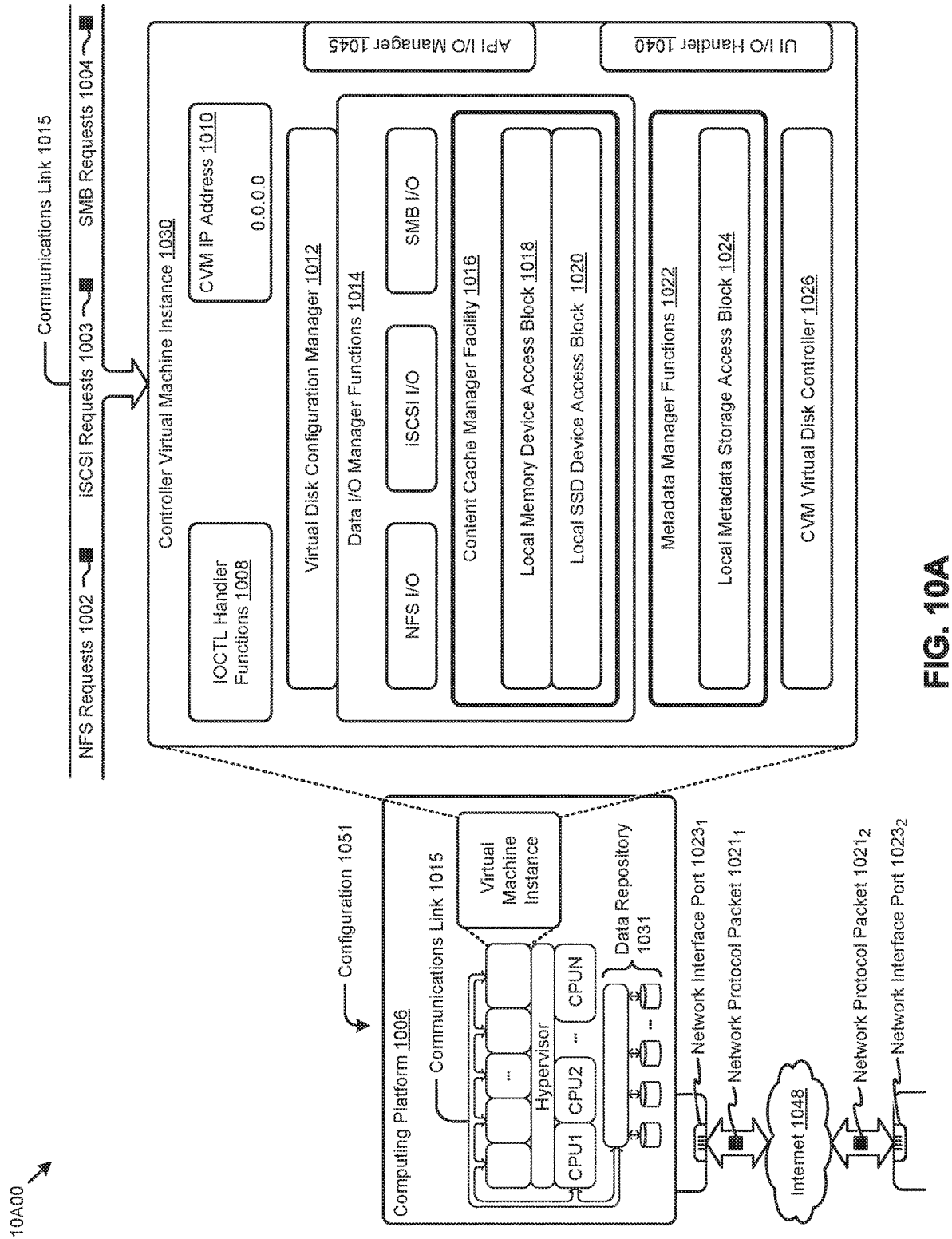
FIG. 10A, FIG. 10B, and FIG. 10C depict virtualized controller architectures comprising collections of interconnected components suitable for implementing embodiments of the present disclosure and/or for use in the herein-described environments.

FIG. 10A depicts a virtualized controller as implemented by the shown virtual machine architecture 10A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 10A00 comprises a collection of interconnected components suitable for implementing embodiments of the present disclosure and/or for use in the herein-described environments. Moreover, virtual machine architecture 10A00 includes a virtual machine instance in configuration 1051 that is further described as pertaining to controller virtual machine instance 1030. Configuration 1051 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 1030.

In this and other configurations, a controller virtual machine instance receives block I/O (input/output or IO) storage requests as network file system (NFS) requests in the form of NFS requests 1002, and/or internet small computer storage interface (iSCSI) block IO requests in the form of iSCSI requests 1003, and/or Samba file system (SMB) requests in the form of SMB requests 1004. The controller virtual machine (CVM) instance publishes and responds to an internet protocol (IP) address (e.g., CVM IP address 1010). Various forms of input and output (I/O or IO) can be handled by one or more IO control handler functions (e.g., IOCTL handler functions 1008) that interface to other functions such as data IO manager functions 1014 and/or metadata manager functions 1022. As shown, the data IO manager functions can include communication with virtual disk configuration manager 1012 and/or can include direct or indirect communication with any of various block IO functions (e.g., NFS IO, iSCSI IO, SMB IO, etc.).

In addition to block IO functions, configuration 1051 supports IO of any form (e.g., block TO, streaming TO, packet-based TO, HTTP traffic, etc.) through either or both of a user interface (UI) handler such as UI IO handler 1040 and/or through any of a range of application programming interfaces (APIs), possibly through API IO manager 1045.

Communications link 1015 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 1030 includes content cache manager facility 1016 that accesses storage locations, possibly including local dynamic random access memory (DRAM) (e.g., through the local memory device access block 1018) and/or possibly including accesses to local solid state storage (e.g., through local SSD device access block 1020).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 1031, which in turn can be formatted into any one or more storage areas, and which can comprise parameterized storage accessible by a key (e.g., a filename, a table name, a block address, an offset address, etc.). External data repository 1031 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 1024. External data repository 1031 can be configured using CVM virtual disk controller 1026, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, CPUN). According to certain embodiments of the disclosure, two or more instances of configuration 1051 can be coupled by communications link 1015 (e.g., backplane, LAN, PSTN, wired or wireless network, etc.) and each instance may perform respective portions of sequences of instructions as may be required to practice embodiments of the disclosure.

The shown computing platform 1006 is interconnected to the Internet 1048 through one or more network interface ports (e.g., network interface port 1023$_1$ and network interface port 1023$_2$). Configuration 1051 can be addressed through one or more network interface ports using an IP address. Any operational element within computing platform 1006 can perform sending and receiving operations using any of a range of network protocols, possibly including network protocols that send and receive packets (e.g., network protocol packet 1021$_1$ and network protocol packet 1021$_2$).

Computing platform 1006 may transmit and receive messages that can be composed of configuration data and/or any other forms of data and/or instructions organized into a data structure (e.g., communications packets). In some cases, the data structure includes program code instructions (e.g., application code) communicated through the Internet 1048 and/or through any one or more instances of communications link 1015. Received program code may be processed and/or executed by a CPU as it is received and/or program code may be stored in any volatile or non-volatile storage for later execution. Program code can be transmitted via an upload (e.g., an upload from an access device over the Internet 1048 to computing platform 1006). Further, program code and/or the results of executing program code can be delivered to a particular user via a download (e.g., a download from computing platform 1006 over the Internet 1048 to an access device).

Configuration 1051 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to policy-based data deduplication. In some embodiments, a module may include one or more state machines and/or combinational logic used to implement or facilitate the operational and/or performance characteristics pertaining to policy-based data deduplication.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of policy-based data deduplication). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to policy-based data deduplication, and/or for improving the way data is manipulated when performing computerized operations pertaining to techniques for deduplication that consider particular storage capabilities that might be desired or required by a particular data owner.

Further details regarding general approaches to managing deduplicated data are described in U.S. patent application Ser. No. 15/459,706 titled "MANAGING DEDUPLICATED DATA", filed on Mar. 15, 2017, which is hereby incorporated by reference in its entirety.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 10B:
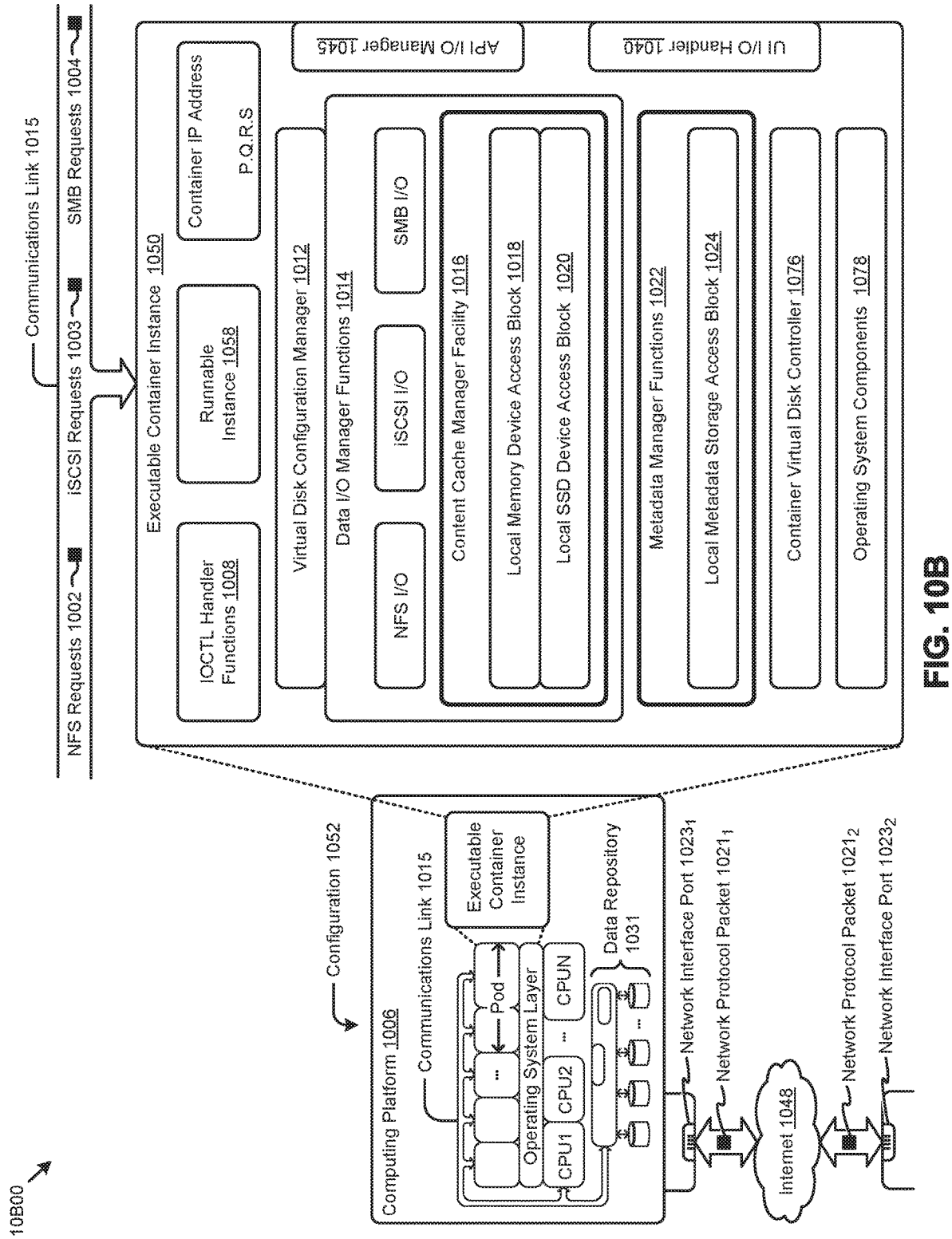

FIG. 10B depicts a virtualized controller implemented by containerized architecture 10B00. The containerized architecture comprises a collection of interconnected components suitable for implementing embodiments of the present disclosure and/or for use in the herein-described environments. Moreover, the shown containerized architecture 10B00 includes an executable container instance in configuration 1052 that is further described as pertaining to the executable container instance 1050. Configuration 1052 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 1050). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 1078, however such a separate set of operating system components need not be provided. As an alternative, an executable container can include runnable instance 1058, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1076. Such a container virtual disk controller can perform any of the functions that the aforementioned CVM virtual disk controller 1026 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 10C:
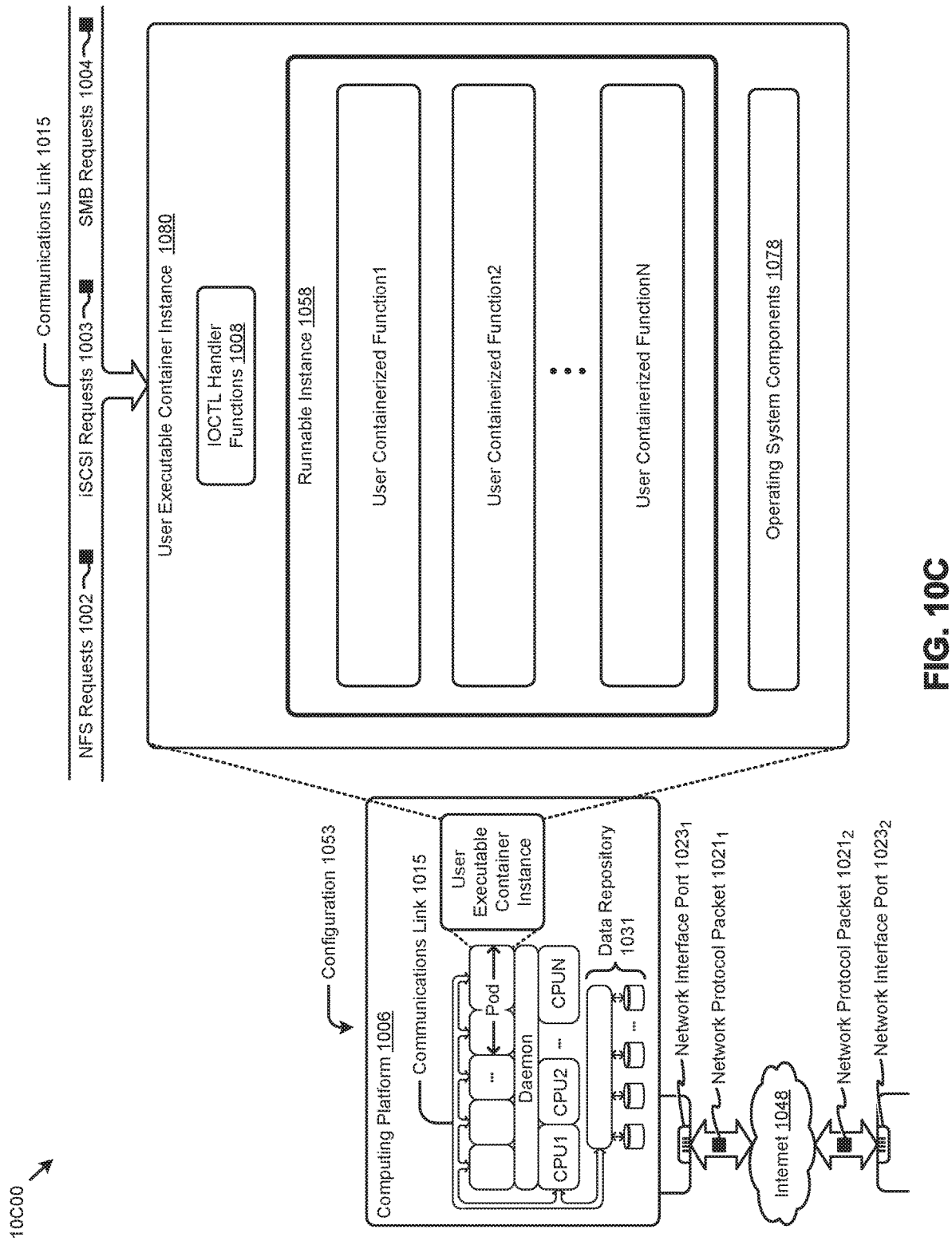

FIG. 10C depicts a virtualized controller implemented by a daemon-assisted containerized architecture 10000. The containerized architecture comprises a collection of interconnected components suitable for implementing embodiments of the present disclosure and/or for use in the herein-described environments. Moreover, the shown instance of daemon-assisted containerized architecture 10000 includes a user executable container instance in configuration 1053 that is further described as pertaining to user executable container instance 1080. Configuration 1053 includes a daemon layer (as shown) that performs certain functions of an operating system.

User executable container instance 1080 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 1058). In some cases, the shown operating system components 1078 comprise portions of an operating system, which portions are interfaced with or included in the runnable instance and/or any user containerized functions. In this embodiment of a daemon-assisted containerized architecture, the computing platform 1006 might or might not host operating system components other than operating system components 1078. More specifically, the shown daemon might or might not host operating system components other than operating system components 1078 of user executable container instance 1080.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
receiving, from a first data producer, a first occurrence of a subject data item to store at a data storage site based at least in part on a first deduplication parameter;
receiving, from a second data producer, a second occurrence of the subject data item to store at the data storage site based at least in part on a second deduplication parameter; and
reconciling the first deduplication parameter against the second deduplication parameter to determine an applicable action to apply to storage the subject data item at the data storage site, wherein:
if the first deduplication parameter and the second deduplication parameter are compatible, both the first occurrence of the subject data item and the second occurrence of the subject data item are maintained using a single data item stored at the data storage site,
if the first deduplication parameter and the second deduplication parameter are not compatible, the first occurrence of the subject data item and the second occurrence of the subject data item are maintained using separate data items stored at the data storage site, and wherein a determination of whether the first deduplication parameter and the second deduplication parameter are compatible is based on a determination that the first deduplication parameter or the second deduplication parameter can satisfy both a first storage rule corresponding to the first deduplication parameter and a second storage rule corresponding to the second deduplication parameter, the first storage rule being associated with a first storage policy of the first data producer, and the second storage rule being associated with a second storage policy of the second data producer.

2. The method of claim 1, further comprising storing an additional copy of the second occurrence of the subject data item at an additional location of the data storage site according to a third deduplication parameter, wherein the additional location of the data storage site comprises a storage location on a different tier from a tier used for storing the second occurrence of the subject data item.

3. The method of claim 1, wherein maintaining the second occurrence of the subject data item using the single data item comprises storing metadata separate from the single data item pertaining to the second occurrence of the subject data item being maintained using the single data item at the data storage site.

4. The method of claim 1, wherein the applicable action to apply to the storage of the subject data item at the data storage site corresponds to storage of the subject data item on at least one of two or more tiers of storage or a remoted data storage site.

5. The method of claim 1, wherein the determination of whether the first deduplication parameter and the second deduplication parameter are compatible is performed before receiving the first and second occurrence of the subject data item.

6. The method of claim 1, wherein the determination of whether the first deduplication parameter and the second deduplication parameter are compatible is performed after a determination that the first occurrence of the subject data item is the same as the second occurrence of the subject data item.

7. The method of claim 1, wherein the first deduplication parameter and the second deduplication parameter are different, and the first deduplication parameter and the second deduplication parameter are determined to be compatible.

8. The method of claim 1, wherein the first deduplication parameter and the second deduplication parameter are compatible and the single data item is moved to a different storage tier at the data storage site.

9. A system comprising:
one or more processors; and
a memory storing instructions that, when executed by the one or more processors, cause the system to perform acts of:
receiving, from a first data producer, a first occurrence of a subject data item to store at a data storage site based at least in part on a first deduplication parameter;
receiving, from a second data producer, a second occurrence of the subject data item to store at the data storage site based at least in part on a second deduplication parameter; and
reconciling the first deduplication parameter against the second deduplication parameter to determine an applicable action to apply to storage the subject data item at the data storage site, wherein:
if the first deduplication parameter and the second deduplication parameter are compatible, both the first occurrence of the subject data item and the second occurrence of the subject data item are maintained using a single data item stored at the data storage site, if the first deduplication parameter and the second deduplication parameter are not compatible, the first occurrence of the subject data item and the second occurrence of the subject data item are maintained using separate data items stored at the data storage site, and wherein a determination of whether the first deduplication parameter and the second deduplication parameter are compatible is based on a determination that the first deduplication parameter or the second deduplication parameter can satisfy both a first storage rule corresponding to the first deduplication parameter and a second storage rule corresponding to the second deduplication parameter, the first storage rule being associated with a first storage policy of the first data producer, and the second storage rule being associated with a second storage policy of the second data producer.

10. The system of claim 9, wherein execution of the instructions causes the system to perform storing an additional copy of the second occurrence of the subject data item at an additional location of the data storage site according to a third deduplication parameter, wherein the additional location of the data storage site comprises a storage location on a different tier from a tier used for storing the second occurrence of the subject data item.

11. The system of claim 9, wherein maintaining the second occurrence of the subject data item using the single data item comprises storing metadata separate from the single data item pertaining to the second occurrence of the subject data item being maintained using the single data item at the data storage site.

12. The system of claim 9, wherein the applicable action to apply to the storage of the subject data item at the data storage site corresponds to storage of the subject data item on at least one of two or more tiers of storage or a remoted data storage site.

13. The system of claim 9, wherein the determination of whether the first deduplication parameter and the second deduplication parameter are compatible is performed before receiving the first and second occurrence of the subject data item.

14. A non-transitory computer readable medium comprising instructions that, when executed by processor of a computer, causes the computer to carry out a method comprising:

receiving, from a first data producer, a first occurrence of a subject data item to store at a data storage site based at least in part on a first deduplication parameter;

receiving, from a second data producer, a second occurrence of the subject data item to store at the data storage site based at least in part on a second deduplication parameter; and reconciling the first deduplication parameter against the second deduplication parameter to determine an applicable action to apply to storage the subject data item at the data storage site, wherein:

if the first deduplication parameter and the second deduplication parameter are compatible, both the first occurrence of the subject data item and the second occurrence of the subject data item are maintained using a single data item stored at the data storage site, if the first deduplication parameter and the second deduplication parameter are not compatible, the first occurrence of the subject data item and the second occurrence of the subject data item are maintained using separate data items stored at the data storage site, and wherein a determination of whether the first deduplication parameter and the second deduplication parameter are compatible is based on a determination that the first deduplication parameter or the second deduplication parameter can satisfy both a first storage rule corresponding to the first deduplication parameter and a second storage rule corresponding to the second deduplication parameter, the first storage rule being associated with a first storage policy of the first data producer, and the second storage rule being associated with a second storage policy of the second data producer.

15. The non-transitory computer readable medium of claim 14, wherein execution of the instructions causes the computer to perform storing an additional copy of the second occurrence of the subject data item at an additional location of the data storage site according to a third deduplication parameter, wherein the additional location of the data storage site comprises a storage location on a different tier from a tier used for storing the second occurrence of the subject data item.

16. The non-transitory computer readable medium of claim 14, wherein maintaining the second occurrence of the subject data item using the single data item comprises storing metadata separate from the single data item pertaining to the second occurrence of the subject data item being maintained using the single data item at the data storage site.

17. The non-transitory computer readable medium of claim 14, wherein the applicable action to apply to the storage of the subject data item at the data storage site corresponds to storage of the subject data item on at least one of two or more tiers of storage or a remoted data storage site.

18. The non-transitory computer readable medium of claim 14, wherein the determination of whether the first deduplication parameter and the second deduplication parameter are compatible is performed before receiving the first and second occurrence of the subject data item.

19. The non-transitory computer readable medium of claim 14, wherein the determination of whether the first deduplication parameter and the second deduplication parameter are compatible is performed after a determination that the first occurrence of the subject data item is the same as the second occurrence of the subject data item.

20. The non-transitory computer readable medium of claim 14, wherein the first deduplication parameter and the second deduplication parameter are different, and the first deduplication parameter and the second deduplication parameter are determined to be compatible.

21. The non-transitory computer readable medium of claim 14, wherein the first deduplication parameter and the second deduplication parameter are compatible and the single data item is moved to a different storage tier at the data storage site.

22. The system of claim 9, wherein the determination of whether the first deduplication parameter and the second deduplication parameter are compatible is performed after a determination that the first occurrence of the subject data item is the same as the second occurrence of the subject data item.

23. The system of claim 9, wherein the first deduplication parameter and the second deduplication parameter are different, and the first deduplication parameter and the second deduplication parameter are determined to be compatible.

24. The system of claim 9, wherein the first deduplication parameter and the second deduplication parameter are compatible and the single data item is moved to a different storage tier at the data storage site.

* * * * *